(12) United States Patent
Hasegawa et al.

(10) Patent No.: US 7,717,404 B2
(45) Date of Patent: May 18, 2010

(54) HUMIDIFIER

(75) Inventors: Takuya Hasegawa, Yokohama (JP);
Takahiko Kondo, Yokohama (JP);
Yoshimichi Mitamura, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 924 days.

(21) Appl. No.: 10/558,639

(22) PCT Filed: May 28, 2004

(86) PCT No.: PCT/JP2004/007722

§ 371 (c)(1),
(2), (4) Date: Sep. 6, 2006

(87) PCT Pub. No.: WO2004/107490

PCT Pub. Date: Dec. 9, 2004

(65) Prior Publication Data

US 2007/0007674 A1 Jan. 11, 2007

(30) Foreign Application Priority Data

May 30, 2003 (JP) .............................. 2003-154881
Aug. 4, 2003 (JP) .............................. 2003-285663

(51) Int. Cl.
*B01F 3/04* (2006.01)

(52) U.S. Cl. ...................................... 261/102; 261/104

(58) Field of Classification Search ................. 261/102, 261/104, 105, 107
See application file for complete search history.

(56) References Cited

U.S. PATENT DOCUMENTS 3,432,357 A * 3/1969 Dankese ...................... 429/34
3,735,559 A * 5/1973 Salemme ........................ 95/52
4,040,804 A 8/1977 Harrison
6,554,261 B2 * 4/2003 Katagiri et al. ............. 261/154
2005/0235615 A1 * 10/2005 Nyman et al. ............... 55/350.1

FOREIGN PATENT DOCUMENTS

| JP | 8-273687 | 10/1996 |
| JP | 11-354142 | 12/1999 |
| JP | 2002-252012 | 9/2002 |
| JP | 2002-313378 | 10/2002 |
| JP | 2002-370017 | 12/2002 |
| JP | 2003-157872 | 5/2003 |

* cited by examiner

*Primary Examiner*—Scott Bushey
(74) *Attorney, Agent, or Firm*—Staas & Halsey LLP

(57) ABSTRACT

A humidifying apparatus comprising: a pleated functional element comprising a pleated structure and, secured to the pleated structure around a periphery thereof, a reinforcing frame, wherein the pleated structure is comprised of a humidifying membrane and, superimposed on at least one surface thereof, a gas-permeable reinforcing material layer, and a dry-side channel and a wet-side channel which are, respectively, provided on opposite sides of the pleated functional element, wherein each of the dry-side channel and the wet-side channel has at least one pair of a gas-intake and a gas-outlet, the humidifying apparatus having a first pressure-buffering means between the gas-intake and an outside conduit connected thereto and a second pressure-buffering means between the gas-outlet and an outside conduit connected thereto, wherein the humidifying membrane divides the internal space of the pleated functional element into spaces which form a part or whole of the dry-side channel and a part or whole of the wet-side channel, respectively.

22 Claims, 21 Drawing Sheets

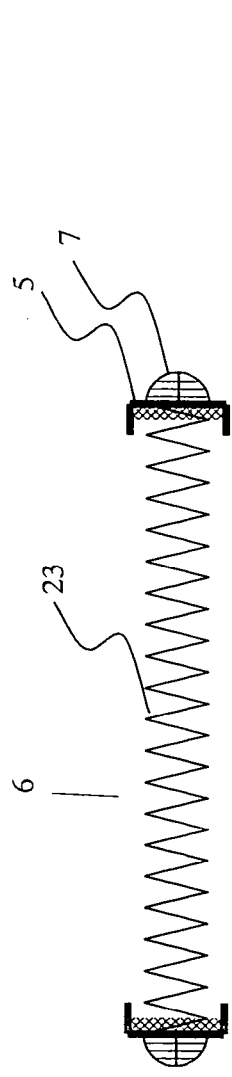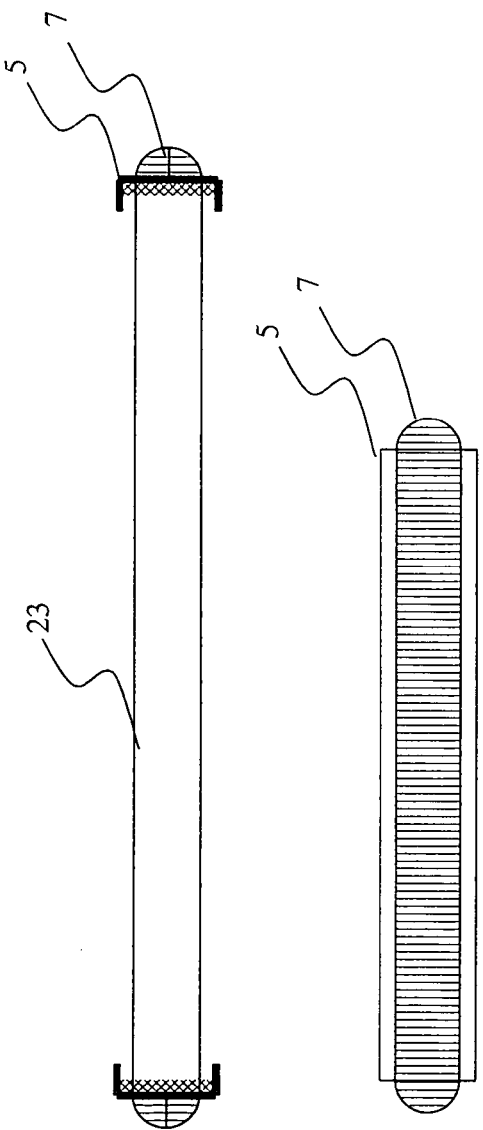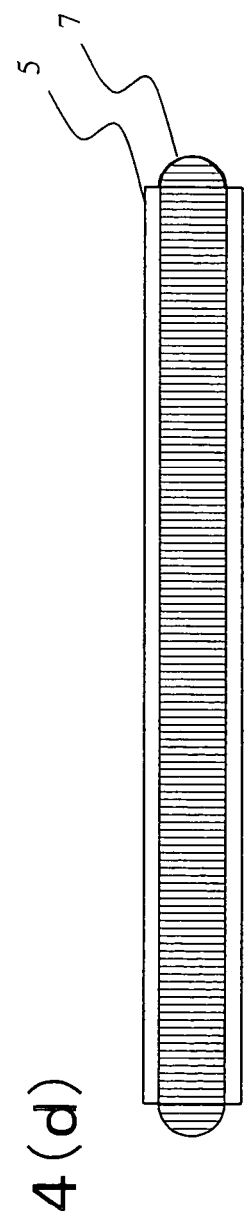
Fig. 4(a) Fig. 4(b) Fig. 4(c) Fig. 4(d)

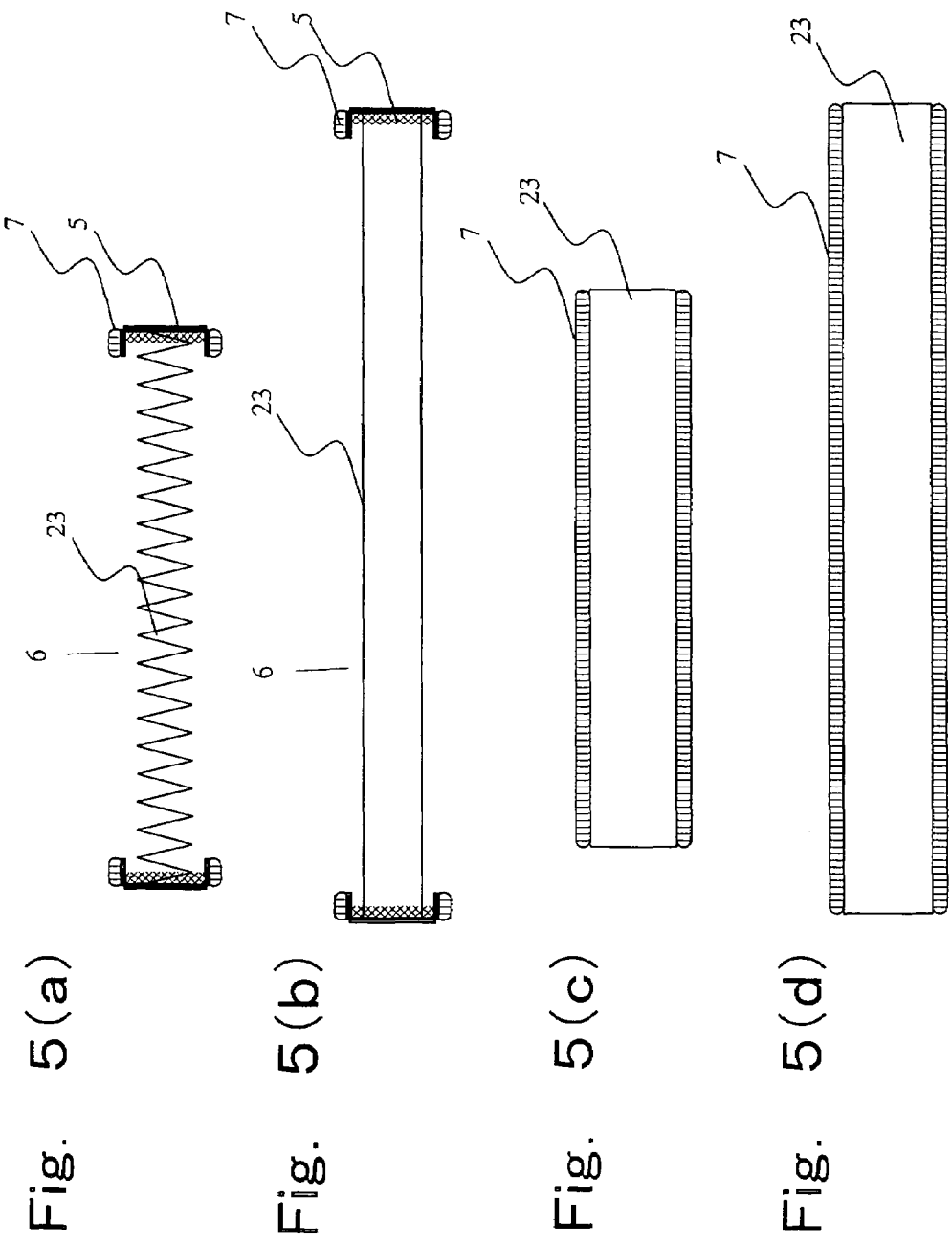

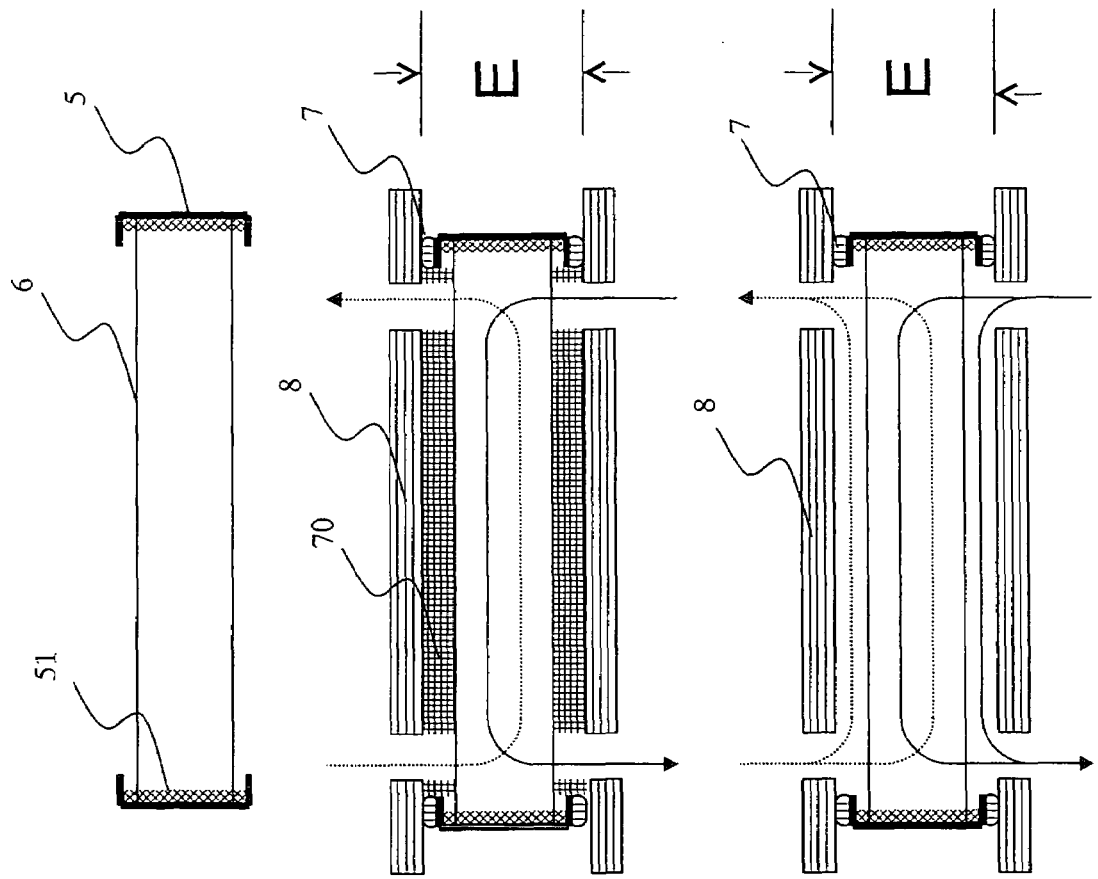

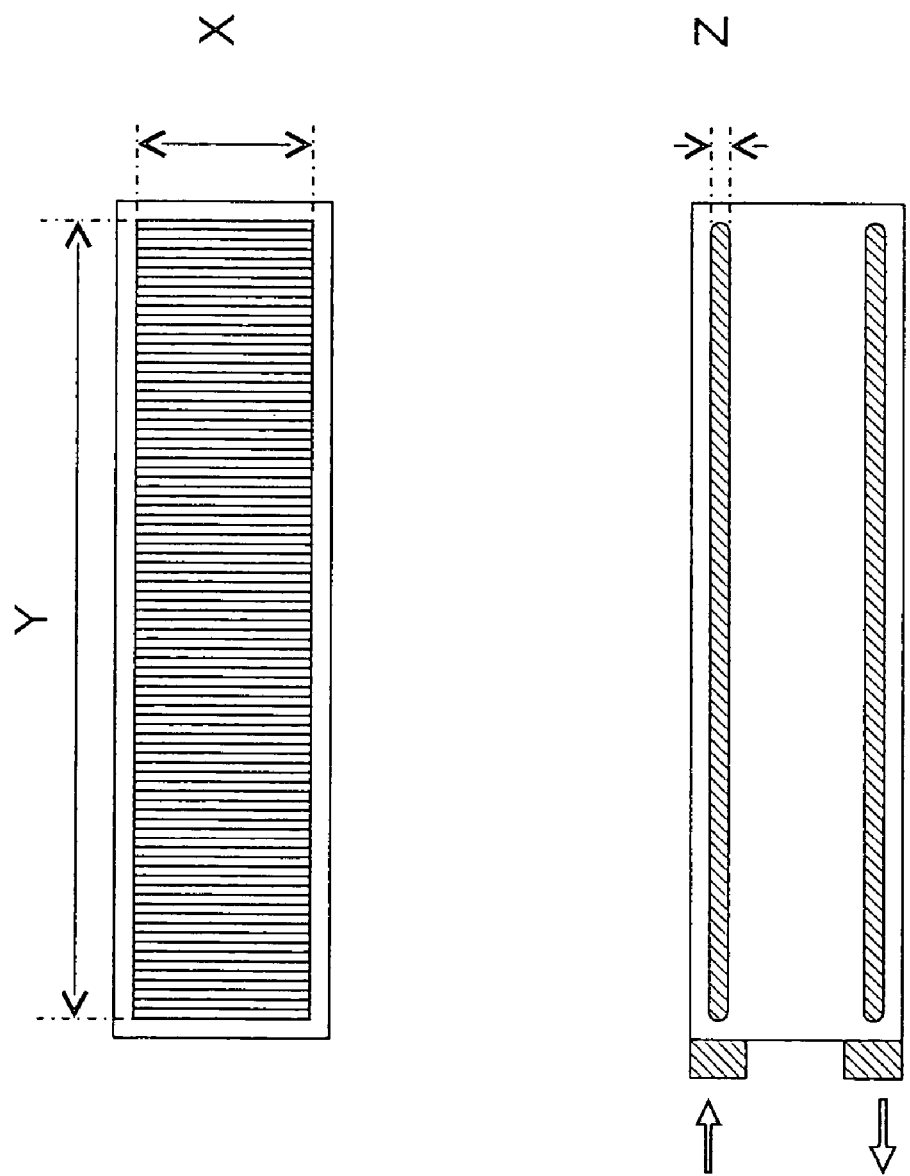

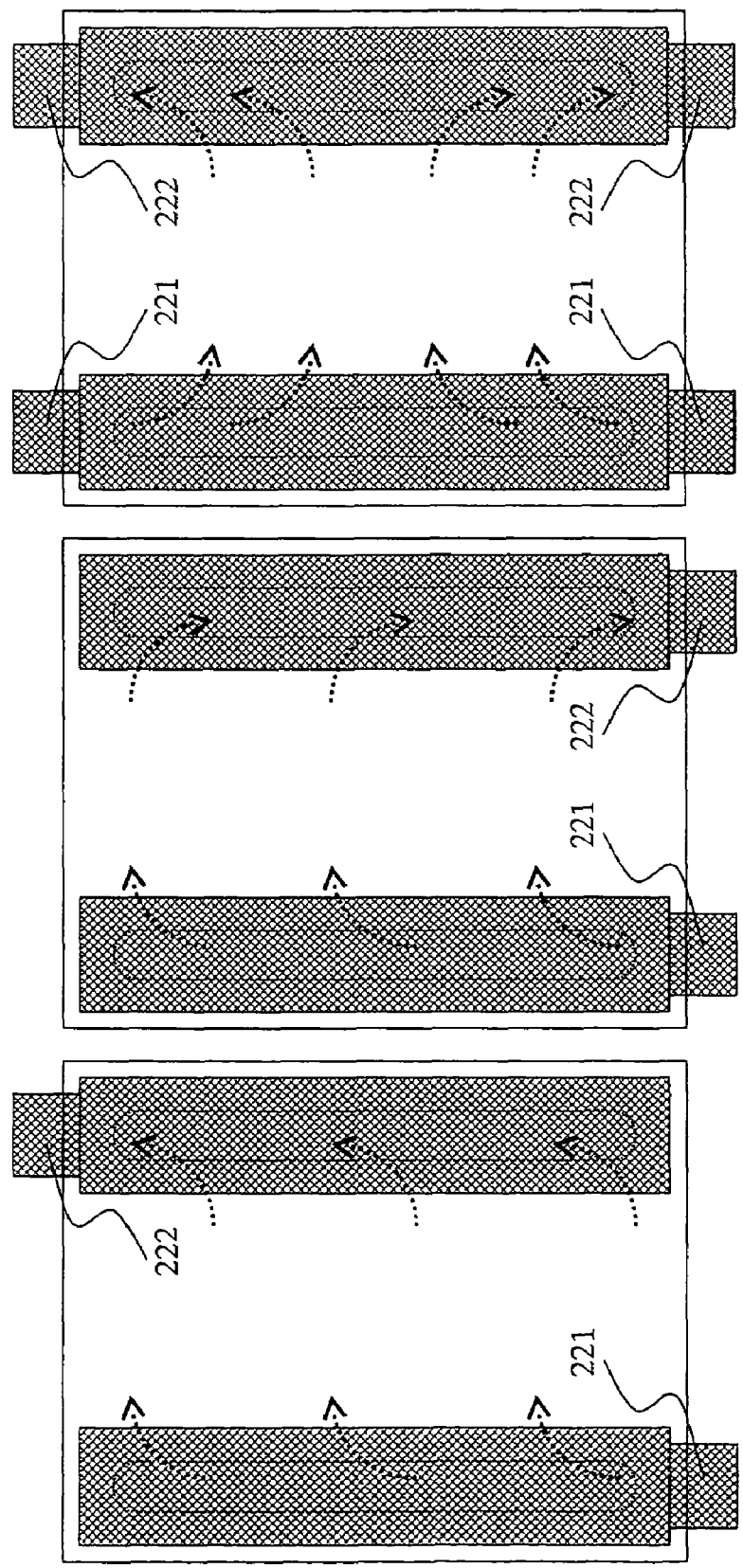

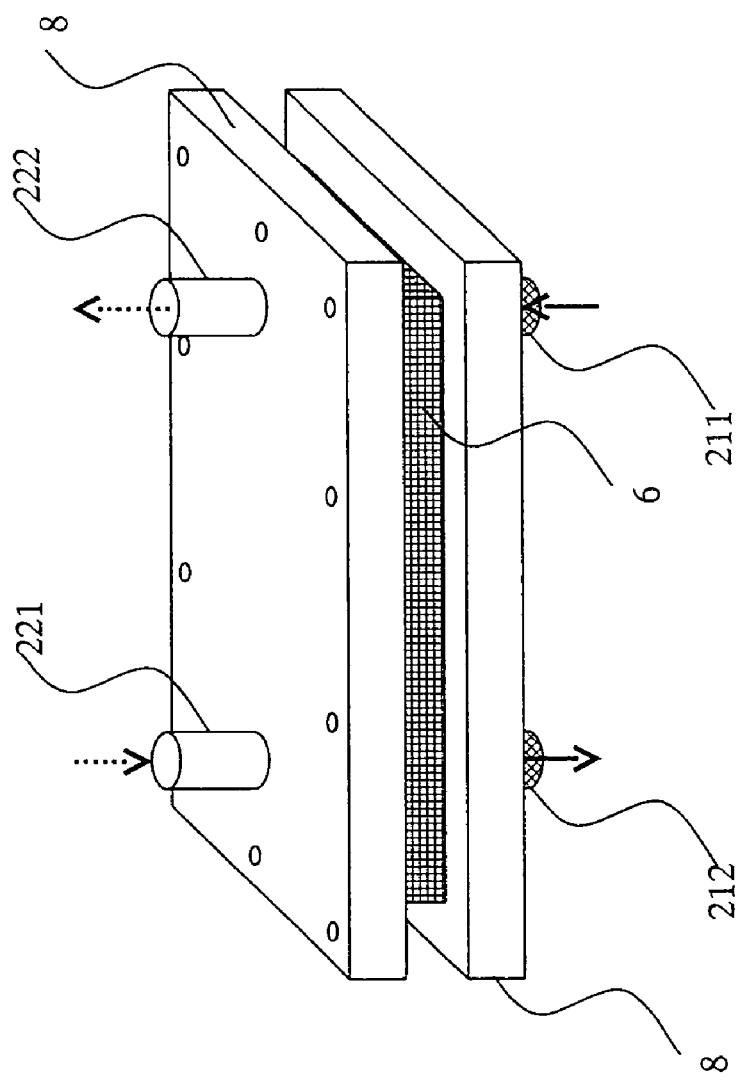

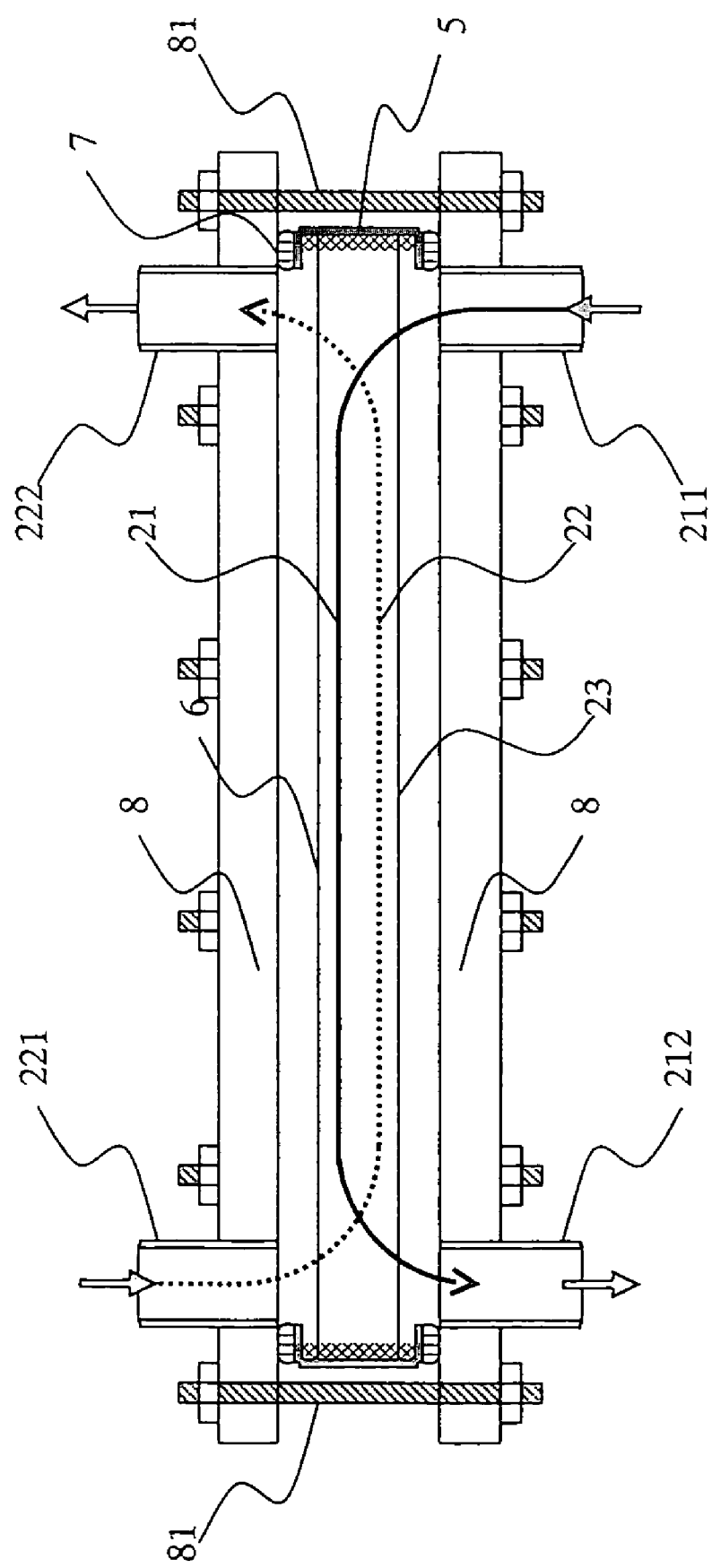

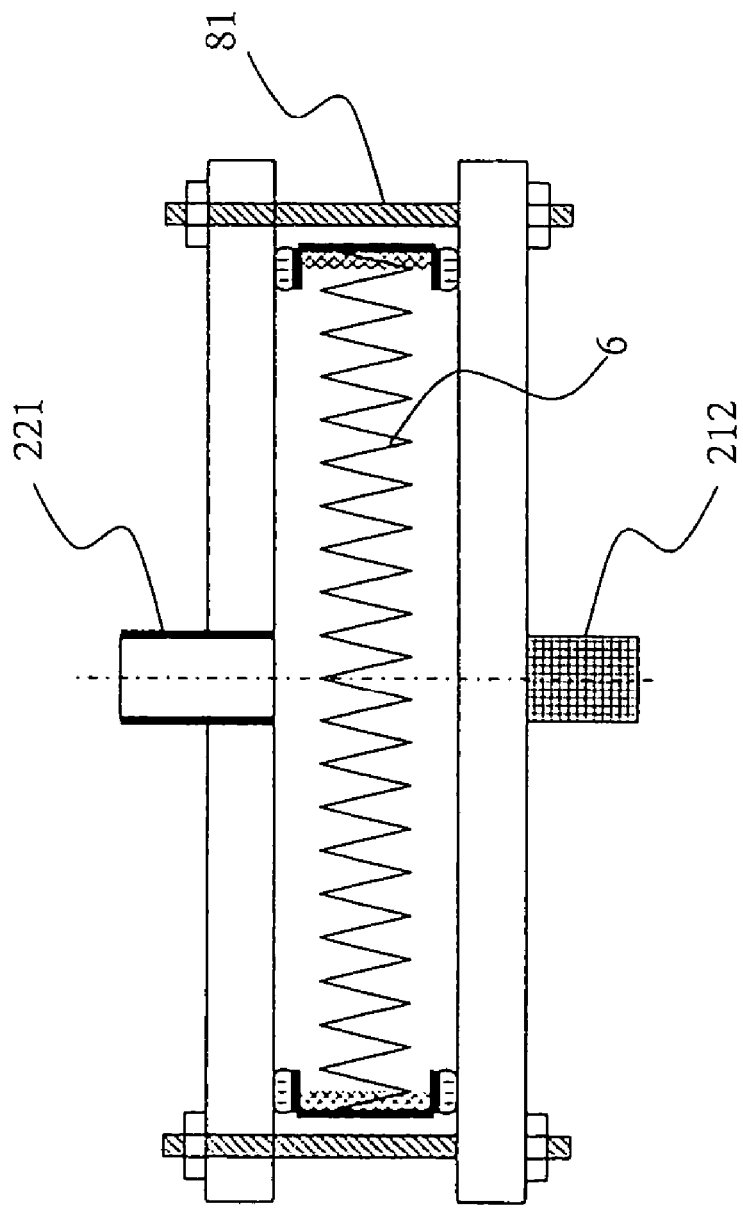

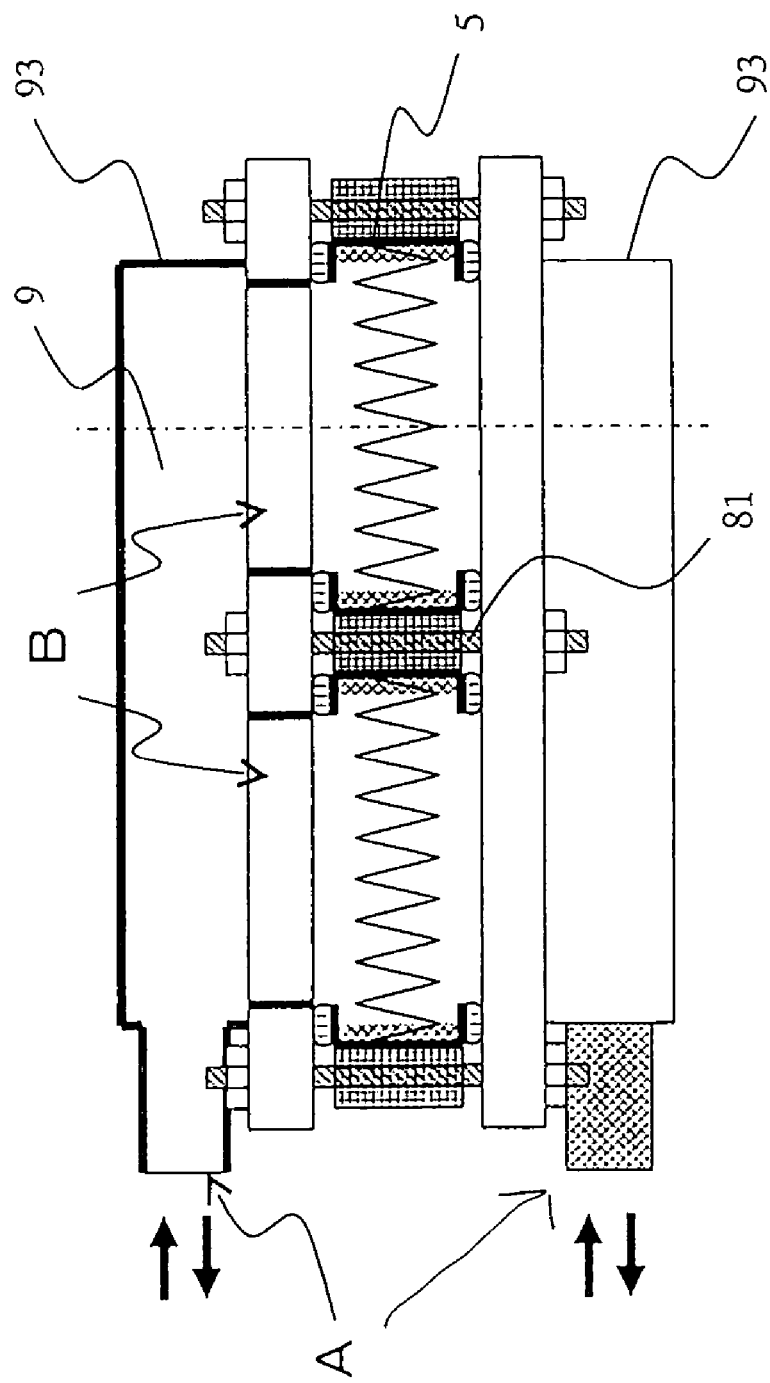

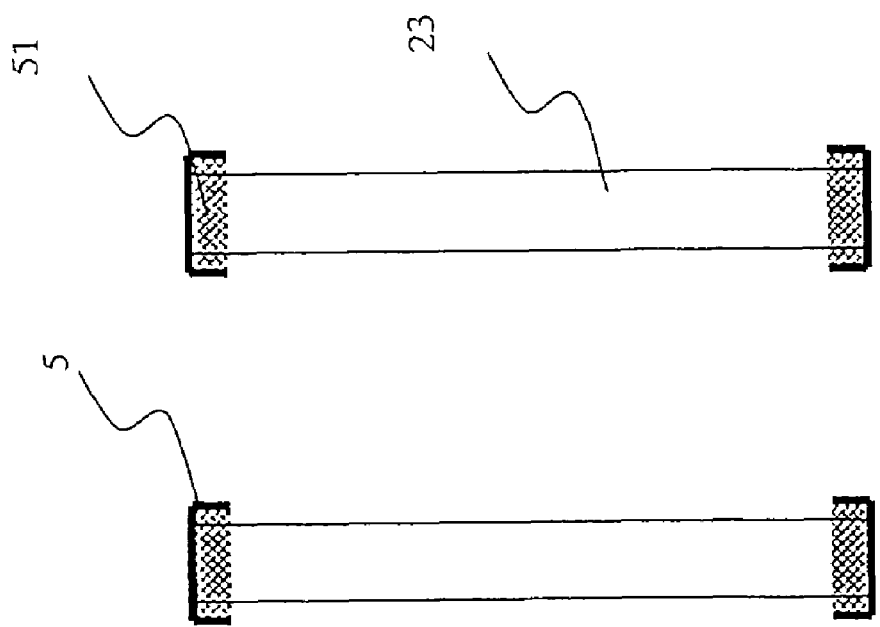
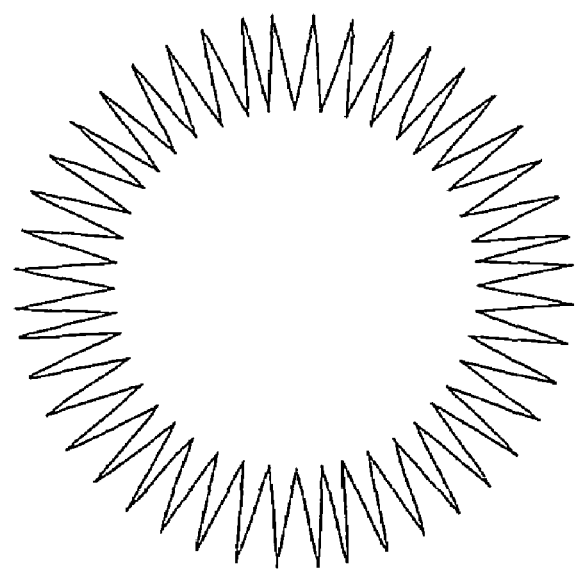

HUMIDIFIER

BACKGROUND OF THE INVENTION

1. Field of the Invention

The present invention relates to a humidifying apparatus. More particularly, the present invention is concerned with a humidifying apparatus comprising:

a pleated functional element comprising a pleated structure and, secured to the pleated structure around a periphery thereof, a reinforcing frame, wherein the pleated structure is comprised of a humidifying membrane and, superimposed on at least one surface thereof, a gas-permeable reinforcing material layer, and a dry-side channel and a wet-side channel which are, respectively, provided on opposite sides of the pleated functional element, wherein each of the dry-side channel and the wet-side channel has at least one pair of a gas-intake and a gas-outlet, the humidifying apparatus having a first pressure-buffering means between the gas-intake and an outside conduit connected thereto and a second pressure-buffering means between the gas-outlet and an outside conduit connected thereto, wherein the humidifying membrane divides the internal space of the pleated functional element into spaces which form a part or whole of the dry-side channel and a part or whole of the wet-side channel, respectively.

The humidifying apparatus of the present invention has excellent properties with respect to humidifying performance, smallness of pressure loss, volume efficiency and durability and can be used to perform efficient humidifying of various gasses. Therefore, the humidifying apparatus of the present invention can be suitably used for supplying moisture to a fuel cell.

2. Prior Art

A fuel cell is one type of an electric generator, in which a fuel, such as hydrogen or methanol, is subjected to electrochemical oxidation, to thereby generate an electrical energy. In recent years, fuel cells are attracting attention as a clean source of energy. In accordance with the type of electrolyte employed, fuel cells are classified into the phosphoric acid type, the molten carbonate type, the solid oxide type and the solid polymer electrolyte type. Of these types, the solid polymer electrolyte type is especially advantageous not in that a standard operating temperature is as low as 100° C. or less, but also in that a high energy density can be obtained. Therefore, fuel cells of the solid polymer electrolyte type are expected to give a wide variety of applications as power sources for use in automobiles and the like.

A solid polymer electrolyte type fuel cell is basically comprised of an ion exchange membrane and a pair of gas-diffusion electrodes which are, respectively, attached to the opposite surfaces of the exchange membrane. In operation, the two gas-diffusion electrodes are connected to each other through a load circuit positioned in the outside of the ion exchange membrane, and hydrogen and oxygen are, respectively, supplied to one and the other of the two gas-diffusion electrodes, thereby performing electric generation. More specifically, during the operation of the fuel cell, protons and electrons are generated at the hydrogen side electrode, and the generated protons moves through the ion exchange membrane toward the oxygen side electrode. When the protons reache the oxygen side electrode, they react with oxygen to form water. On the other hand, the generated electrons are led through the lead line to the external load circuit where the electric energy is taken out, and whereupon the electrons are further led through the lead line to the oxygen side electrode where the electrons contribute to the progress of the above-mentioned water forming reaction.

As a material for the ion exchange membrane, there are widely used fluorine-containing ion exchange resins by virtue of their high chemical stability. Of fluorine-containing ion exchange resins, there is widely used Nafion™ (manufactured and sold by E.I. duPont de Nemours & Company Inc.). "Nafion" is a perfluorinated polymer comprised of a perfluorocarbon main chain and pendant chains having a terminal sulfonic acid group. As well known in the art, for a fluorine-containing ion exchange resin to exhibit a high ion conductivity, it is necessary that the fluorine-containing ion exchange resin be well swollen with water. Therefore, in the case of applications in mobile machines (in which water supply is limited), specifically fuel cells installed in automobiles, how to ensure water supply to fuel cells is an important task.

As described above, in a fuel cell, water is formed by the reaction which occurs at the oxygen side electrode thereof. Therefore, if the water vapor contained in the exhaust gas discharged from the oxygen side electrode can be recovered and used to humidify a gas supplied to the oxygen side electrode or the hydrogen side electrode, self-sufficiency in water supply can be ensured, thereby removing the need for using a water tank or the like. In the present invention, the term "humidifying apparatus" means an apparatus in which a water vapor-permeable humidifying membrane is disposed to partition a space into two sides, wherein, in operation, water vapor contained in a gas present on one side of the humidifying membrane is used to humidify another gas present on the other side of the humidifying membrane. The humidifying apparatus for a fuel cell installed in an automobile is required to have the following properties:

1) Humidifying performance: the ability to provide moisture sufficient for the operation of a fuel cell.
2) Smallness of pressure loss: the pressure loss is satisfactorily small so as not to place a heavy burden on a compressor.
3) Volume efficiency
4) Durability With respect to the prior art of the humidifying apparatus, for example, Unexamined Japanese Patent Application Laid-Open Specification No. Hei 11-354142 discloses a humidifying apparatus comprising a plurality of semi-permeable membranes (water vapor permeable membranes) which are stacked in the same direction as that of a stack of fuel cells. By this technique it is possible to humidify a gas supplied to the oxygen side electrode or the hydrogen side electrode; however, this technique has problem in that a considerably large number of semi-permeable membranes are required to be used in order to provide a membrane surface area which is necessary to effect a satisfactory level of humidifying, so that the increase in the number of semi-permeable membranes results in disadvantages not only in that there is increased the number of sealing portions of semi-permeable membranes, leading to an increase in the production cost, but also in that the number of gas passages (separators) for the semi-permeable membranes is increased, leading to a lowering of volume efficiency.

Unexamined Japanese Patent Application Laid-Open Specification No. Hei 8-273687 discloses a humidifying apparatus characterized in that it employs water vapor permeable membranes which are hollow fiber membranes. This technique is advantageous in that, because of the use of a hollow fiber, there is no need for the use of a separator (which is necessary in the above-mentioned Unexamined Japanese Patent Application Laid-Open Specification No. Hei 11-354142), thereby improving the volume efficiency. However, this technique has a problem in that the flow of gas is likely to be uneven due to the occurrence of an uneven positioning of hollow fibers, thus rendering it impossible to obtain a satisfactory humidifying. Further, since both of the inside and outside of a hollow fiber are exposed to a high speed gas stream, the hollow fiber receives internal and external vibrational forces, resulting in vigorous flattering of the hollow fiber. Such hollow fibers flattering vigorously undergo mutual friction and, hence, are likely to be abraded or broken. In addition, both fixed ends of each hollow fiber flattering vigorously sustain large stress and, hence, are likely to be broken.

Unexamined Japanese Patent Application Laid-Open Specification No. 2002-252012 discloses a humidifying apparatus which comprises a casing and, disposed therein, a cylindrical pleated element made of a water vapor permeable membrane, wherein the cylindrical pleated element is obtained by a method in which a pleated, water vapor permeable membrane is rolled into a cylindrical form, whereupon the both ends of the membrane which have come to meet each other by the rolling are gas-tightly sealed/connected to each other, and the both ends of the resultant cylindrical form are, respectively, gas-tightly sealed by connecting thereto doughnut-shaped terminal plates. This technique is advantageous in that, by virtue of the use of a pleated membrane, this technique is free from the problems of an increased cost and a lowering of volume efficiency (as encountered in the case of the technique of the above-mentioned Unexamined Japanese Patent Application Laid-Open Specification No. Hei 11-354142) and from the problem of a low durability (as encountered in the case of the technique of the above-mentioned Unexamined Japanese Patent Application Laid-Open Specification No. Hei 8-273687). However, this technique has a problem in that, as seen from the descriptions of FIG. 3 and paragraph 30 of this patent document, the above-mentioned cylindrical pleated element used in this technique generally has a hollow (dead space) having a diameter which is as large as about a half of the outer diameter of the cylindrical pleated element, so that the volume efficiency is still unsatisfactory. Further, this technique has also a problem in that, as seen from the description of FIG. 2 of this patent document, gas inlet 211 and gas outlet 212 are disposed directly above the surface of the cylindrical pleated element, so that most of the gas flows are directly blown onto the local surfaces of the cylindrical pleated element, thus rendering it difficult to effect even distribution of the gas flows onto the entire surface of the water vapor permeable membrane.

As described hereinabove, the conventional humidifying apparatuses have many problems to be solved, and there has not yet been developed a satisfactory humidifying apparatus.

SUMMARY OF THE INVENTION

In this situation, the present inventors have made extensive and intensive studies with a view toward solving the above-mentioned problems accompanying the prior art, i.e., with a view toward developing a humidifying apparatus which has excellent properties with respect to humidifying performance, smallness of pressure loss, volume efficiency and durability. As a result, it has unexpectedly been found that this objective can be attained by a humidifying apparatus comprising:

a pleated functional element comprising a pleated structure and, secured to the pleated structure around a periphery thereof, a reinforcing frame, wherein the pleated structure is comprised of a humidifying membrane and, superimposed on at least one surface thereof, a gas-permeable reinforcing material layer, and a dry-side channel and a wet-side channel which are, respectively, provided on opposite sides of the pleated functional element, wherein each of the dry-side channel and the wet-side channel has at least one pair of a gas-intake and a gas-outlet, the humidifying apparatus having a first pressure-buffering means between the gas-intake and an outside conduit connected thereto and a second pressure-buffering means between the gas-outlet and an outside conduit connected thereto, wherein the humidifying membrane divides the internal space of the pleated functional element into spaces which form a part or whole of the dry-side channel and a part or whole of the wet-side channel, respectively. The present invention has been completed, based on this finding.

Accordingly, it is an object of the present invention to provide a humidifying apparatus which has excellent properties with respect to humidifying performance, smallness of pressure loss, volume efficiency and durability and which can be suitably used for supplying moisture to a fuel cell.

The foregoing and other objects, features and advantages of the present invention will be apparent from the following detailed description taken in connection with the accompanying drawings, and the appended claims.

BRIEF DESCRIPTION OF THE DRAWINGS

In the drawings:

FIG. 2(*b*) is a diagrammatic view of another example of the pleated structure used in the present invention;

FIG. 2(*c*) is a diagrammatic view of the construction of the channels of the humidifying element used in the present invention;

FIG. 3(*b*) is a diagrammatic cross-sectional view of the suitably usable, plane-type pleated functional element shown in FIG. 3(*a*), taken along a line perpendicular to the direction of the pleats;

FIG. 3(*c*) is a diagrammatic cross-sectional view of the suitably usable, plane-type pleated functional element shown in FIG. 3(*a*), taken along a line parallel to the direction of the pleats;

FIG. 4(*a*) is a diagrammatic cross-sectional view of an example of the sealing material used for the plane-type pleated functional element used in the present invention, taken along a line perpendicular to the direction of the pleats;

FIG. 4(*b*) is a diagrammatic cross-sectional view of an example of the sealing material used for the plane-type pleated functional element used in the present invention, taken along a line parallel to the direction of the pleats;

FIG. 4(*c*) is a diagrammatic outside view of an example of the sealing material used for the plane-type pleated functional element used in the present invention, as viewed along a line parallel to the direction of the pleats;

FIG. 4(*d*) is a diagrammatic outside view of an example of the sealing material used for the plane-type pleated functional element used in the present invention, as viewed along a line perpendicular to the direction of the pleats;

FIG. 5(*a*) is a diagrammatic cross-sectional view of another example of the sealing material used for the plane-type pleated functional element used in the present invention, taken along a line perpendicular to the direction of the pleats;

FIG. 5(b) is a diagrammatic cross-sectional view of another example of the sealing material used for the plane-type pleated functional element used in the present invention, taken along a line parallel to the direction of the pleats;

FIG. 5(c) is a diagrammatic outside view of another example of the sealing material used for the plane-type pleated functional element used in the present invention, as viewed along a line parallel to the direction of the pleats;

FIG. 5(d) is a diagrammatic outside view of another example of the sealing material used for the plane-type pleated functional element used in the present invention, as viewed along a line perpendicular to the direction of the pleats;

FIG. 6(a) is a diagrammatic view of the pleated functional element before the channels are provided around it;

FIG. 6(b) is a diagrammatic view of an example of a humidifying element in which no space is provided above the pleats of the pleated structure;

FIG. 6(c) is a diagrammatic view of an example of a humidifying element in which a space is provided above the pleats of the pleated structure;

FIG. 8(a) is a diagrammatic plan view of a pleated functional element having an inner length of X and an inner width of Y;

FIG. 8(b) is a diagrammatic view showing the positions of the gas-intake and gas-outlet of the pleated functional element (shown in FIG. 8(a)) having an inner length of X and an inner width of Y, as in the case where any of the dry-side channel and the wet-side channel is not divided into at least two sub-channels;

FIG. 9(a) is a diagrammatic view showing an example of how to flow a gas through the pressure-buffering means used in the present invention;

FIG. 9(b) is a diagrammatic view showing another example of how to flow a gas through the pressure-buffering means used in the present invention;

FIG. 9(c) is a diagrammatic view showing still another example of how to flow a gas through the pressure-buffering means used in the present invention;

FIG. 10(a) is a diagrammatic explanatory view showing a pressure-plate type housing;

FIG. 11(a) is a diagrammatic cross-sectional view of the pressure-plate type housing shown in FIG. 10(a), taken along a line parallel to the direction of the pleats;

FIG. 11(b) is a diagrammatic cross-sectional view of the pressure-plate type housing shown in FIG. 10(a), taken along a line perpendicular to the direction of the pleats;

FIG. 13(b) is a diagrammatic cross-sectional view of an example of a humidifying element (used in the present invention) divided into two parts, taken along a line perpendicular to the direction of the pleats;

FIG. 15(b) is a diagrammatic plan view of the pleated structure used in the cylindrical, pleated functional element shown in FIG. 15(a); and FIG. 15(c) is a diagrammatic cross-sectional view of the cylindrical, pleated functional element shown in FIG. 15(a), taken along a line parallel to the direction of the pleats.

DESCRIPTION OF REFERENCE NUMERALS

Figure 1:
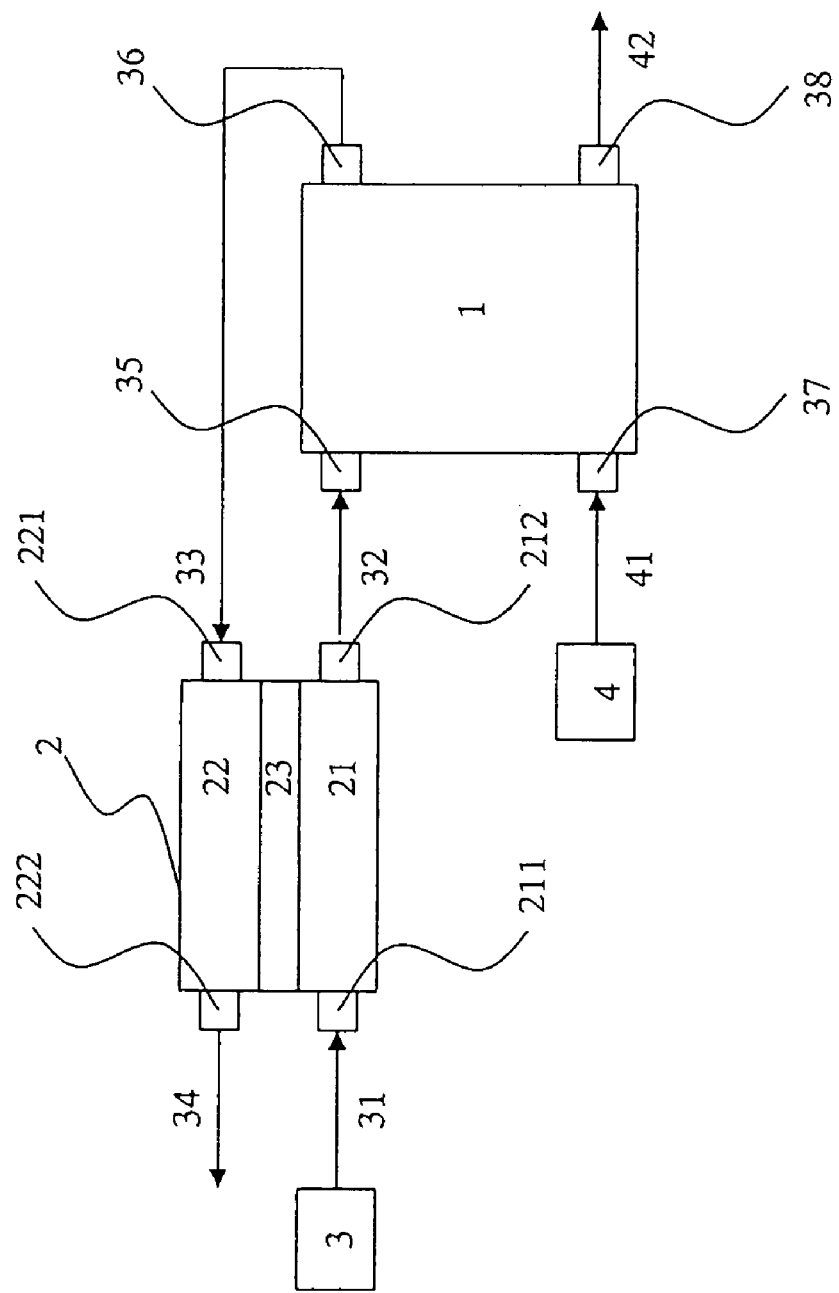
FIG. 1 is a diagrammatic view of a fuel cell system containing a one embodiment of the humidifying apparatus of the present invention.

1: Fuel cell
2: Humidifying element
3: Compressor
4: Source of hydrogen supply
5: Reinforcing frame
6: Pleated functional element
7: Sealing material
8: Housing
9: Pressure-buffering means
21, 21S and 21M: Dry-side channel
22, 22S and 22M: Wet-side channel
23: Humidifying membrane/reinforcing layer structure (i.e., pleated structure)
23A: Humidifying membrane
23B: Gas-permeable reinforcing material layer
31, 32, 33, 34, 41 and 42: pipeline
35, 37, 211 and 221: Gas-intake
36, 38, 212 and 222: Gas-outlet
51: Adhesive
61: Width of gas-intake or gas-outlet
62: Length of gas-intake or gas-outlet
63: Distance between gas-intake and gas-outlet
70: Means for providing a channel
81: Stud bolt
82: Reinforcing material
91, 92: Opening A
93: Face opposite to opening A
A: Opening A
B: Opening B

DETAILED DESCRIPTION OF THE INVENTION

In one aspect of the present invention, there is provided a humidifying apparatus comprising:

a pleated functional element comprising a pleated structure and, secured to the pleated structure around a periphery thereof, a reinforcing frame, wherein the pleated structure is comprised of a humidifying membrane and, superimposed on at least one surface thereof, a gas-permeable reinforcing material layer, and a dry-side channel and a wet-side channel which are, respectively, provided on opposite sides of the pleated functional element, wherein each of the dry-side channel and the wet-side channel has at least one pair of a gas-intake and a gas-outlet, the humidifying apparatus having a first pressure-buffering means between the gas-intake and an outside conduit connected thereto and a second pressure-buffering means between the gas-outlet and an outside conduit connected thereto, wherein the humidifying membrane divides the internal space of the pleated functional element into spaces which form a part or whole of the dry-side channel and a part or whole of the wet-side channel, respectively.

For easier understanding of the present invention, the essential features and various preferred embodiments of the present invention are enumerated below.

1. A humidifying apparatus comprising:
a pleated functional element comprising a pleated structure and, secured to the pleated structure around a periphery thereof, a reinforcing frame, wherein the pleated structure is comprised of a humidifying membrane and, superimposed on at least one surface thereof, a gas-permeable reinforcing material layer, and a dry-side channel and a wet-side channel which are, respectively, provided on opposite sides of the pleated functional element, wherein each of the dry-side channel and the wet-side channel has at least one pair of a gas-intake and a gas-outlet, the humidifying apparatus having a first pressure-buffering means between the gas-intake and an outside conduit connected thereto and a second pressure-buffering means between the gas-outlet and an outside conduit connected thereto, wherein the humidifying membrane divides the internal space of the pleated functional element into spaces which form a part or whole of the dry-side channel and a part or whole of the wet-side channel, respectively.

2. The humidifying apparatus according to item 1 above, which optionally further comprises at least one additional pleated functional element, and wherein the pleated functional element and optionally the at least one additional pleated functional element are sandwiched between two opposite pressure plates, which are gas-tightly attached to the reinforcing frame of the pleated functional element and optionally the reinforcing frame of at least one additional pleated functional element.

3. The humidifying apparatus according to item 1 or 2 above, wherein at least one channel selected from the group consisting of the dry-side channel and the wet-side channel has two or more pairs of the gas-intakes and the gas-outlets.

4. The humidifying apparatus according to any one of items 1 to 3 above, wherein at least one channel selected from the group consisting of the dry-side channel and the wet-side channel is divided into at least two sub-channels.

5. The humidifying apparatus according to any one of items 1 to 4 above, wherein the humidifying membrane has a heat shrinkage ratio of not more than 10%, as measured at 120° C.

6. The humidifying apparatus according to any one of items 1 to 5 above, wherein the height of the pleats of the pleated structure is in the range of from 5 to 200 mm.

7. The humidifying apparatus according to any one of items 1 to 6 above, wherein the pleated functional element has a length of 300 mm or less.

8. The humidifying apparatus according to any one of items 1 to 7 above, wherein the pleated functional element has a buckling strength of 10 kPa or more.

9. The humidifying apparatus according to any one of items 1 to 8 above, wherein each of the dry-side channel and the wet-side channel has a portion where the ratio (C) of the height of the channel to the height of the pleats of the pleated structure is in the range of from 1.0 to 5.0, the volume ratio (V) of the wet-side channel to the dry-side channel is in the range of from 0.5 to 100, and the ratio (M) of the pleats pitch (P) of the pleated structure to the thickness (T) of the pleated structure is in the range of from 0.8 to 3.0.

10. The humidifying apparatus according to any one of items 1 to 9 above, wherein at least one channel selected from the group consisting of the dry-side channel and the wet-side channel has a gas channel-control means provided in a space above the pleats of the pleated structure.

11. The humidifying apparatus according to any one of items 1 to 10 above, which further comprises at least one additional pleated functional element comprising a pleated structure and, secured to the pleated structure around a periphery thereof, a reinforcing frame, wherein the pleated structure is comprised of a humidifying membrane and, superimposed on at least one surface thereof, a gas-permeable reinforcing material layer, wherein the pleated functional element and the at least one additional pleated functional element are laterally arranged.

12. The humidifying apparatus according to any one of items 1 to 11 above, which further comprises at least one additional pleated functional element comprising a pleated structure and, secured to the pleated structure around a periphery thereof, a reinforcing frame, wherein the pleated structure is comprised of a humidifying membrane and, superimposed on at least one surface thereof, a gas-permeable reinforcing material layer, wherein the pleated functional element and the at least one additional pleated functional element are piled one upon another so that two mutually adjacent pleated functional elements are disposed in a face-to-face relationship on their respective wet-sides or on their respective dry-sides.

More specifically, the present invention is as follows.

1. A humidifying apparatus for humidifying a dry working gas using a moist gas, which comprises:
a pleated functional element comprising a pleated structure and, secured to the pleated structure around a periphery thereof, a reinforcing frame, a moist gas feeding-side channel (A) (i.e., the above-mentioned wet-side channel), and a dry gas humidifying-side channel (B) (i.e., the above-mentioned dry-side channel), wherein the moist gas feeding-side channel (A) and the dry gas humidifying-side channel (B) are, respectively, provided on opposite sides of the pleated functional element, the pleated structure comprising a humidifying layer (formed by the above-mentioned humidifying membrane) passing therethrough the water vapor selectively from the moist gas comprised of water vapor entrained by a carrier gas and, superimposed on at least one surface thereof, a gas-permeable reinforcing layer (formed by the above-mentioned gas-permeable reinforcing material layer), the moist gas feeding-side channel (A) having at least one intake (A-1) for feeding thereinto the moist gas, and at least one outlet (A-2) for withdrawing therefrom an exhaust gas comprised of a carrier gas which is depleted of the water vapor, the dry gas humidifying-side channel (B) having at least one intake (B-1) for feeding thereinto a dry working gas, and at least one outlet (B-2) for withdrawing therefrom a humidified working gas, wherein a moist gas-flow buffering means (i.e., the above-mentioned pressure buffering-means provided in association with the moist gas feeding-side channel (A)) is provided in association with the at least one intake (A-1) for feeding a moist gas, and a dry working gas-flow buffering means (i.e., the above-mentioned pressure-buffering means provided in association with the dry gas humidifying-side channel (B)) is provided in association with the at least intake (B-1) for feeding a dry working gas, wherein, in operation, the moist gas fed from the at least one intake (A-1) into the moist gas feeding-side channel (A) supplies water vapor through the pleated structure to the dry working gas fed from the at least one intake (B-1) into the dry gas humidifying-side channel (B), thereby humidifying the dry working gas.

2. The humidifying apparatus according to item 1 above, which optionally further comprises at least one additional pleated functional element, and wherein the pleated functional element and optionally the at least one additional pleated functional element are sandwiched between two opposite pressure plates, which are gas-tightly attached to the reinforcing frame of the pleated functional element and optionally the reinforcing frame of at least one additional pleated functional element.

3. The humidifying apparatus according to item 1 or 2 above, wherein the number of at least one member selected from the group consisting of the at least one intake (A-1), the at least one outlet (A-2), the at least one intake (B-1) and the at least one outlet (B-2) is two or more.

4. The humidifying apparatus according to any one of items 1 to 3 above, wherein at least one channel selected from the group consisting of the moist gas feeding-side channel (A) and the dry gas humidifying-side channel (B) is divided into at least two sub-channels.

5. The humidifying apparatus according to any one of items 1 to 4 above, wherein the humidifying layer has a heat shrinkage ratio of not more than 10%, as measured at 120° C. with respect to a humidifying membrane used to form the humidifying layer.

6. The humidifying apparatus according to any one of items 1 to 5 above, wherein the average height of the pleats of the pleated structure is in the range of from 5 to 200 mm.

7. The humidifying apparatus according to any one of items 1 to 6 above, wherein the pleated functional element has a length of 300 mm or less as measured in a direction parallel to the pleats of the pleated structure.

8. The humidifying apparatus according to any one of items 1 to 7 above, wherein the pleated functional element has a buckling strength of 10 kPa or more.

9. The humidifying apparatus according to any one of items 1 to 8 above, wherein each of the ratio (C) of the height of the moist gas feeding-side channel (A) to the average height of the pleats of the pleated structure and the ratio (C') of the height of the dry gas humidifying-side channel (B) to the average height of the pleats of the pleated structure is in the range of from 1.0 to 5.0, the volume ratio (V) of the moist gas feeding-side channel (A) to the dry gas humidifying-side channel (B) is in the range of from 0.5 to 100, and the ratio (M) of the pleats pitch (P) of the pleated article to the thickness (T) of the pleated structure is in the range of from 0.8 to 3.0.

10. The humidifying apparatus according to any one of items 1 to 9 above, wherein at least one channel selected from the group consisting of the moist gas feeding-side channel (A) and the dry gas humidifying-side channel (B) has a gas flow-control means (i.e., the above-mentioned gas channel-control means) provided in a space above the pleats of the pleated structure.

11. The humidifying apparatus according to any one items 1 to 10 above, which further comprises at least one additional pleated functional element comprising a pleated structure and, secured to the pleated structure around a periphery thereof, a reinforcing frame, wherein the pleated structure is comprised of a humidifying layer passing therethrough the water vapor selectively from the moist gas and, superimposed on at least one surface thereof, a gas-permeable reinforcing layer, wherein the pleated functional element and the at least one additional pleated functional element are laterally arranged.

12. The humidifying apparatus according to any one of items 1 to 10 above, which further comprises at least one additional pleated functional element comprising a pleated structure and, secured to the pleated structure around a periphery thereof, a reinforcing frame, wherein the pleated structure is comprised of a humidifying layer passing therethrough the water vapor selectively from the moist gas and, superimposed on at least one surface thereof, a gas-permeable reinforcing layer, wherein the pleated functional element and the at least one additional pleated functional element are piled one upon another so that two mutually adjacent pleated functional elements are disposed in a face-to-face relationship on their respective sides of moist gas feeding or on their respective sides of dry gas humidifying.

Hereinbelow, the present invention is described in detail.

[Definition of Various Terms]

In the present invention, the term "humidifying element" means a minimum unit performing the humidifying function. The humidifying element comprises:

a pleated structure (comprised of a humidifying membrane/reinforcing layer structure), a reinforcing frame which is secured to the pleated structure around a periphery thereof, and a dry-side channel and a wet-side channel which are, respectively, provided on opposite sides of the pleated structure, wherein each of the dry-side channel and the wet-side channel has at least one pair of a gas-intake and a gas-outlet.

In the present invention, the term "humidifying membrane/reinforcing layer structure" means a basic component of the humidifying element, the basic component being a multilayer structure comprising a humidifying membrane and, superimposed on at least one surface thereof, a gas-permeable reinforcing material layer.

In the present invention, the term "humidifying membrane" means a selective permeability membrane which allows selective passage of water vapor from a gaseous mixture containing water vapor, and this term also covers a selective permeability membrane which exhibits a selective permeability only in the presence of a specific amount of water vapor (for example, the porous humidifying membrane which is described below). A selective permeability membrane exhibits a property which does not allow passage of a gas other than water vapor, and such property is frequently called "leak resistance". In the present invention, a planar membrane which can be fabricated into a pleated body is used as a humidifying membrane having excellent leak resistance.

In the present invention, the term "gas-permeable reinforcing material layer" means a layer which not only serves to prevent close contact between adjacent humidifying membranes in the pleated functional element to thereby achieve highly efficient use of membranes, but also functions to impart a self-supporting property to the pleated structure.

In the present invention, the term "pleated structure" means a structure which is obtained by pleating a planar humidifying membrane/reinforcing layer structure. Herein, the term "pleating" means processing a humidifying membrane/reinforcing layer structure so as to obtain a structure such that a cross-sectional view of the humidifying membrane/reinforcing layer structure exhibits v-shapes, u-shapes or Ω-shapes which are connected in series (see, for example, FIGS. 2(a) and 2(b)). A pleated form of a humidifying membrane/reinforcing layer structure is advantageous in that a large surface area of the humidifying membrane can be accommodated in a predetermined projected area or a predetermined volume, as compared to the case of an unpleated form of a humidifying membrane/reinforcing layer structure.

In the present invention, the term "reinforcing frame" means a structural material which can be used to form a pleated functional element by gas-tightly securing the structural material to the periphery of a pleated structure. When the reinforcing frame is gas-tightly secured to the periphery of the pleated structure, the reinforcing frame exhibits the function of gas-tightly separating the upper and lower sides of the pleated functional element. As a material for a reinforcing frame, there can be used various materials, depending on the desired use. Examples of materials for a reinforcing frame include a resin, a metal and fiber reinforced plastic (FRP).

In the present invention, the term "pleated functional element" means an assembly which comprises a pleated structure and a reinforcing frame and which constitutes a part of the humidifying element. That is, the pleated functional element can be referred to as a body which is "a humidifying element" minus "a gas-intake, a gas-outlet, a dry-side channel and a wet-side channel".

In the present invention, the term "housing" means an auxiliary means which provides the humidifying element with auxiliary functions, i.e., functions other than the humidifying function, specifically, for example, the function of protecting against mechanical destruction and the function of connecting the humidifying element to outside conduits. In general, a humidifying element is accommodated in or connected to a housing providing practically required additional functions, so as to constitute a humidifying apparatus which exhibits all required functions.

In the present invention, the term "length of pleats" means the size or distance of pleats, as viewed along a line parallel to the pleats, and the term "width of pleats" means the size or distance of pleats, as viewed along a line perpendicular to the pleats.

Hereinbelow, embodiments of the present invention are explained with reference to the appended figures.

[Fuel Cell System]

FIG. 1 shows a diagrammatic view of a fuel cell system containing one embodiment of the humidifying apparatus of the present invention. (In FIG. 1, for easier understanding of the humidifying system used in the present invention, the housing is omitted.) The fuel cell uses hydrogen gas and air. Humidifying element 2 is equipped with dry-side channel 21, wet-side channel 22, gas-intakes 211 and 221, gas-outlets 212 and 222, and humidifying membrane/reinforcing layer structure 23 which separates the dry-side channel 21 and the wet-side channel 22 from each other. Air is introduced to dry-side channel 21, and the exhaust gas from the cathode-side of fuel cell 1 is introduced to wet-side channel 22. Gas-intake 211 provided at dry-side channel 21 of humidifying element 2 has connected thereto compressor 3 (which is a source of air supply) through conduit 31. Gas-outlet 212 provided at dry-side channel 21 is connected through conduit 32 to gas-intake 35 provided on the cathode side of fuel cell 1. Gas-intake 221 at wet-side channel 22 is connected through conduit 33 to gas-outlet 36 on the cathode side of fuel cell 1. Gas-outlet 222 at wet-side channel 22 has connected thereto conduit 34 for exhaust gas. Source 4 of hydrogen supply is connected through conduit 41 to gas-intake 37 on the anode side of fuel cell 1, and gas-outlet 38 on the anode side of fuel cell 1 has connected thereto conduit 42 for exhaust gas.

The exhaust gas from the cathode side of fuel cell 1 is a gaseous mixture comprising water produced by the fuel cell reaction, water which has been supplied from humidifying element 2, but has not been absorbed in the inside of fuel cell 1, oxygen which has been supplied from humidifying element 2, but has not been used in the fuel cell reaction, and a non-oxygen gas (e.g., nitrogen) which has been introduced from humidifying element 2. The above-mentioned gaseous mixture is introduced through conduit 33 into wet-side channel 22 of humidifying element 2. Humidifying membrane/reinforcing layer structure 23 allows passage of only water vapor, so that the water vapor in wet-side channel 22 is transferred into dry-side channel 21, thereby humidifying the air in dry-side channel 21. The thus humidified air in dry-side channel 21 is transferred through conduit 32 and is introduced through gas-intake 35 into the cathode side of fuel cell 1. Thus, humidifying element 2 can stably perform the humidifying required for the operation of fuel cell 1, without changing the composition and/or pressure of gas other than water vapor. Therefore, the humidifying element used in the present invention is especially suitable for application in a fuel cell automobile.

Dry-side channel 21 is pressurized with compressor 3, so that the total pressure in dry-side channel 21 is higher than that of wet-side channel 22. Humidifying membrane 23 is required to have not only the property of allowing selective passage of water vapor from a gaseous mixture containing water vapor, but also a satisfactory leak resistance (i.e., a property which does not allow passage of a gas (including air) other than water vapor) in the presence of a total pressure difference.

[Humidifying Membrane]

The water vapor permeability (i.e., the above-mentioned property of allowing selective passage of water vapor) of the humidifying membrane can be evaluated by various methods. For example, there can be mentioned the moisture permeability test described in JIS-L1099. Further, the non-permeability of the humidifying membrane against a gas (including air) other than water vapor (i.e., the property of not allowing passage of a gas (including air) other than water vapor) can be evaluated by various methods. For example, there can be mentioned the gas permeability test described in JIS-P-8117. When the humidifying membrane is employed for supplying moisture to a fuel cell, it is preferred that the humidifying membrane has a satisfactory heat resistance as well as the above-mentioned properties (i.e., water vapor permeability and non-permeability against a gas other than water vapor). The humidifying membrane is classified into a porous humidifying membrane, a uniform humidifying membrane and a composite humidifying membrane.

The moisture permeability (i.e., water vapor permeability) of the humidifying membrane is preferably 100 g/m²/hr or more, more preferably 500 g/m²/hr or more, still more preferably 1,000 g/m²/hr or more, most preferably 1,500 g/m²/hr or more.

The gas permeability (i.e., impermeability of a gas other than water vapor) (as measured in accordance with JIS-P-8117) of the humidifying membrane is preferably 500 seconds or more, more preferably 1,000 seconds or more, still more preferably 10,000 or more, still more preferably 100,000 or more, most preferably 1,000,000 or more. It should be noted that a porous humidifying membrane (described below) exhibits impermeability against a gas other than water vapor only under wet conditions, and that, hence, the impermeability of a porous humidifying membrane cannot be evaluated by the above-mentioned gas permeability test.

The heat shrinkage ratio of the humidifying membrane is preferably not more than 12%, more preferably not more than 10%, still more preferably not more than 8%, still more preferably not more than 6%, most preferably not more than 4%, as measured at 120° C. In the present invention, the heat shrinkage ratio is defined as a heat shrinkage as measured at 120° C. for 60 seconds.

The thickness of the humidifying membrane is preferably from 1 to 1,000 μm. The lower limit of the thickness of the humidifying membrane is more preferably 5 μm or more, still more preferably 10 μm or more, most preferably 20 μm or more. The upper limit of the thickness of the humidifying membrane is more preferably 500 μm or less, still more preferably 300 μm or less, most preferably 200 μm or less. When the thickness of the humidifying membrane is less than 1 μm, the mechanical strength of the humidifying membrane may possibly become unsatisfactory. On the other hand, when the thickness of the humidifying membrane is more than 1,000 μm, the water vapor permeability of the humidifying membrane may possibly be lowered.

[Porous Humidifying Membrane]

As a porous humidifying membrane, there can be used a woven fabric, a non-woven fabric, a microporous membrane or the like. As well known in the art, when a porous humidifying membrane having a pore diameter of 10 μm or less is placed in contact with a water vapor-containing gas, the so-called "Kelvin condensation" occurs, namely, water vapor is condensed in the pores of the porous humidifying membrane to thereby form a liquid membrane, thereby exhibiting the above-mentioned leak resistance. Because the above-mentioned liquid membrane comprises water, the liquid membrane exhibits high water vapor permeability, and is capable of allowing the passage of water vapor at the same rate as in the case of free water which is present on the surface of the liquid membrane.

The pore diameter of the porous humidifying membrane is preferably from 0.001 to 10 μm. The lower limit of the pore diameter is more preferably 0.005 μm or more, still more preferably 0.01 μm or more. The upper limit of the pore diameter is more preferably 5 μm or less, still more preferably 1 μm or less, still more preferably 0.5 μm or less, still more preferably 0.2 μm or less, most preferably 0.1 μm or less. When the pore diameter is less than 0.001 μm, the water vapor permeability of the porous humidifying membrane may possibly become unsatisfactory. On the other hand, when the pore diameter is more than 10 μm, it may possibly become difficult to cause the above-mentioned Kelvin condensation to occur.

The pore ratio of the porous humidifying membrane is preferably from 5 to 90%. The lower limit of the pore ratio is more preferably 10% or more, still more preferably 20% or more, still more preferably 30% or more, most preferably 40% or more. When the pore ratio is less than 5%, the water vapor permeability of the porous humidifying may possibly become unsatisfactory. On the other hand, when the pore ratio is more than 90%, the mechanical strength of the porous humidifying membrane may possibly become unsatisfactory.

[Uniform Humidifying Membrane]

A uniform membrane comprised of a water vapor-permeable material is called "uniform humidifying membrane".

Examples of water vapor-permeable materials include polymer nonelectrolytes (such as polyethylene oxide, polyvinyl alcohol, cellulose ether and starch) and copolymers thereof; polymer electrolytes (such as polyacrylic acid, polyacrylamide, polyisopropyl acrylamide, polystyrene sulfonic acid, polyvinyl pyridine and polyamino acid) and copolymers and salts thereof; and conventional water-absorbing resins and conventional water-containing resins, such as the above-mentioned fluorine-containing ion exchange resin. If desired, for adjusting the water content of the uniform humidifying membrane or rendering the uniform humidifying membrane water-insoluble, the uniform humidifying membrane may be subjected to a treatment, such as crosslinking (e.g., ionic crosslinking, chemical crosslinking or radioactive crosslinking) or reinforcement (e.g., fiber reinforcement or fibril reinforcement).

The water content of the water vapor-permeable material is preferably from 5 to 95%. The lower limit of the water content is more preferably 20% or more, still more preferably 40% or more, still more preferably 60% or more, most preferably 80% or more. The upper limit of the water content is more preferably 90% or less. When the water content is less than 5%, it is sometimes difficult to achieve a satisfactory humidifying performance. On the other hand, when the water content is more than 95%, problems are posed in that the shrinkage ratio of the humidifying membrane at the time of drying the humidifying membrane becomes disadvantageously high and in that the mechanical strength of the humidifying membrane is lowered.

[Composite Humidifying Membrane]

A composite membrane which is obtained by coating a water vapor-permeable material on a porous substrate (e.g., a woven fabric, a nonwoven fabric or a microporous membrane), or impregnating a porous substrate with a water vapor-permeable material, is called a "composite humidifying membrane".

Examples of water vapor-permeable materials include polymer nonelectrolytes (such as polyethylene oxide, polyvinyl alcohol, cellulose ether and starch) and copolymers thereof; polymer electrolytes (such as polyacrylic acid, polyacrylamide, polyisopropyl acrylamide, polystyrene sulfonic acid, polyvinyl pyridine and polyamino acid) and copolymers and salts thereof; and conventional water-absorbing resins and conventional water-containing resins, such as the above-mentioned fluorine-containing ion exchange resin. If desired, for adjusting the water content of the uniform humidifying membrane or rendering the uniform humidifying membrane water-insoluble, the uniform humidifying membrane may be subjected to a treatment, such as crosslinking (e.g., ionic crosslinking, chemical crosslinking or radioactive crosslinking) or reinforcement (e.g., fiber reinforcement or fibril reinforcement).

The water content of the water vapor-permeable material is preferably from 5 to 95%. The lower limit of the water content is more preferably 20% or more, still more preferably 40% or more, still more preferably 60% or more, most preferably 80% or more. The upper limit of the water content is more preferably 90% or less. When the water content is less than 5%, it is sometimes difficult to achieve a satisfactory humidifying performance. On the other hand, when the water content is more than 95%, problems are posed in that the shrinkage ratio of the humidifying membrane at the time of drying the humidifying membrane becomes disadvantageously high and in that the mechanical strength of the humidifying membrane is lowered.

[Gas-Permeable Reinforcing Material]

A gas-permeable reinforcing material is a netted or porous sheet which can be superimposed on a humidifying membrane to thereby maintain the pleat pitch of the pleated structure and readily introduce a gas into the inner portion of the pleated structure. In general, a humidifying membrane lacks stiffness; however, by laminating a gas-permeable reinforcing material on the humidifying membrane, it becomes possible to improve the self-supporting property and structural strength (especially buckling strength) of the pleated structure.

The gas-permeable reinforcing material may be superimposed on both surfaces of the humidifying membrane or on one surface of the humidifying membrane. Especially when there is a pressure difference between the dry-side channel and the wet-side channel (which are separated by the humidifying membrane), it is preferred to provide the gas-permeable reinforcing material layer at least on the low-pressure side (which is generally the wet side).

Examples of gas-permeable reinforcing materials include woven fabrics, non-woven fabrics, resin nets (e.g., polypropylene nets, polyester nets and nylon nets) and metal nets. Among these, resin nets and metal nets are preferred.

The thickness of the gas-permeable reinforcing material is preferably from 10 to 5,000 μm. The lower limit of the thickness is more preferably 100 μm or more, still more preferably 200 μm or more, most preferably 500 μm or more. The upper limit of the thickness is more preferably 3,000 μm or less, still more preferably 2,000 μm or less, most preferably 1,000 μm or less. When the thickness is less than 10 μm, the mechanical strength may possibly become unsatisfactory. On the other hand, when the thickness is more than 5,000 μm, the water vapor permeability may possibly be lowered. The thickness of the gas-permeable reinforcing material is measured in accordance with JIS-L1096.

The pore ratio of the gas-permeable reinforcing material is preferably from 30 to 95%. The lower limit of the pore ratio is more preferably 40% or more, still more preferably 50% or more, still more preferably 60% or more, most preferably 70% or more. When the pore ratio is less than 30%, the water vapor permeability may possibly be lowered. On the other hand, when the pore ratio is more than 95%, the mechanical strength may possibly be lowered.

The heat shrinkage ratio of the gas-permeable reinforcing material is preferably not more than 12%, more preferably not more than 10%, still more preferably not more than 8%, still more preferably not more than 6%, most preferably not more than 4%, as measured at 100° C.

The gas permeability (as measured in accordance with JIS-P-8117) of the gas-permeable reinforcing material is preferably not more than 100 seconds, more preferably not more than 10 seconds, still more preferably not more than 1 second.

When a netted sheet is used as the gas-permeable reinforcing material, the mesh number is preferably from 2 to 1,000. The lower limit of the mesh number is more preferably 3 or more, still more preferably 5 or more, still more preferably 10 or more, most preferably 12 or more. The upper limit of the mesh number is more preferably 100 or less, still more preferably 50 or less, still more preferably 30 or less, most preferably 20 or less.

The fiber diameter of a fiber forming the netted sheet is preferably from 0.01 to 2 mm. The lower limit of the fiber diameter is more preferably 0.02 mm or more, still more preferably 0.04 mm or more, still more preferably 0.06 mm, most preferably 0.08 mm or more. The upper limit of the fiber diameter is more preferably 1 mm or less, still more preferably 0.6 mm or less, still more preferably 0.4 mm or less, most preferably 0.2 mm or less.

When a netted sheet having a mesh number of 100 or less is used, for protecting the humidifying membrane, it is preferred to provide an additional thin layer of gas-permeable reinforcing material between the humidifying membrane and the gas-permeable reinforcing material. With respect to the above-mentioned additional thin layer of gas-permeable reinforcing material, it is preferred that at least one surface thereof is subjected to smoothing treatment before use.

[Pleated Structure]

A pleated structure can be obtained by subjecting a planar humidifying membrane/reinforcing layer structure to pleating. In general, a pleated structure is obtained by subjecting a multilayer structure comprised of a humidifying membrane and a gas-permeable reinforcing material to pleating. However, if necessary, a humidifying membrane alone may be subjected to pleating, followed by attaching thereto of a pleated body of gas-permeable reinforcing material so that the pleats of the gas-permeable reinforcing material are meshed with the pleats of the humidifying membrane.

Figure 2A:
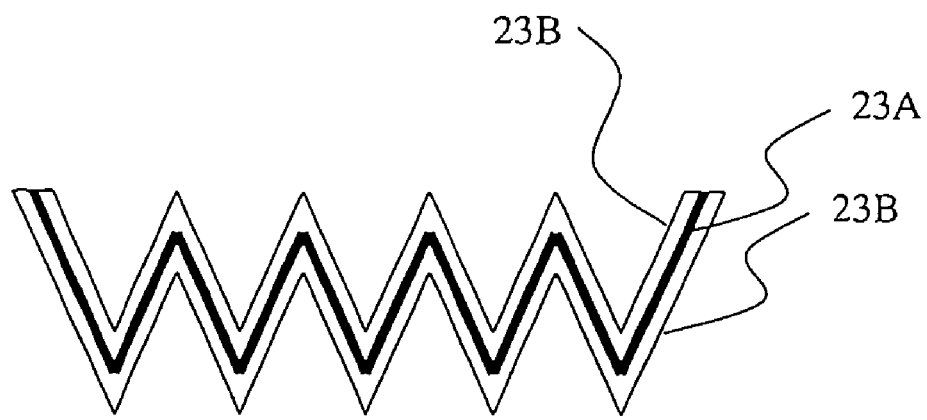
FIG. 2(*a*) is a diagrammatic view of an example of the pleated structure used in the present invention.
Figure 2B:
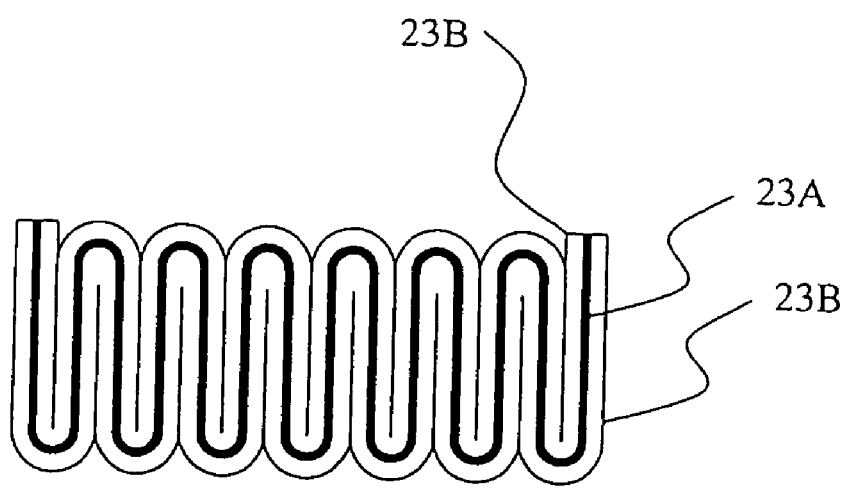

Each of FIGS. 2(a) and 2(b) shows a diagrammatic view of an example of the pleated structure used in the present invention. Each of FIGS. 2(a) and 2(b) shows a pleated structure obtained by pleating a humidifying membrane/reinforcing layer structure comprising humidifying membrane 23A and gas-permeable reinforcing material 23B.

The pleating may be performed by any conventional method. For example, there may be used a reciprocal (accordion) pleat machine or a rotary pleat machine.

The "height (H)" of the pleats means the distance between the levels of pleat apexes of the opposite sides of the pleated structure. When the distance between the levels of pleat apexes of the opposite sides of the pleated structure are not uniform, an average value of distances is defined as the height (H). The height (H) is preferably from 5 to 200 mm. The lower limit of the height (H) is more preferably 10 mm or more, still more preferably 15 mm or more. The upper limit of the height (H) is more preferably 150 mm or less, still more preferably 100 mm or less, still more preferably 80 mm or less, most preferably 50 mm or less.

[Reinforcing Frame]

The reinforcing frame (which constitutes a part of the pleated functional element) may be planar or may have its upper and lower side portions inwardly bent at right angles so as to assume a channel shape or the like. By providing such a bent portion, not only does it become possible to improve the strength of the reinforcing frame and to increase the contact area between the reinforcing frame and the pleated structure, but also it becomes easy to form an gas-tight connection between the reinforcing frame and a housing. As described below, in the present invention, it is especially preferred that a housing is gas-tightly connected to the end surfaces of the reinforcing frame. In the present invention, "an end surface of the reinforcing frame" means either a cross-sectional surface which faces upwardly or downwardly relative to the position of the pleated structure in the case where a planar reinforcing frame is used, or means the outer surface of a bent portion in the case where a reinforcing frame having the above-mentioned bent portion is used.

The thickness of the reinforcing frame is preferably from 0.1 to 5 mm. The lower limit of the thickness is more preferably 0.2 mm or more, still more preferably 0.5 mm or more. The upper limit of the thickness is more preferably 4 mm or less, still more preferably 3 mm or less, most preferably 2 mm or less.

The height of the reinforcing frame is generally adjusted depending on the height (H) of the pleats. However, by intentionally making the height of the reinforcing frame larger than the height (H) of the pleated structure, it becomes possible to provide a space above and below the pleated structure (which space is referred to as a "spatial channel", and is described below). When a plurality of materials are combined to form the reinforcing frame, from the viewpoint of improving the strength of a portion connected to a housing, it is preferred that the reinforcing frame has a nested structure.

The width of the bent portion of the reinforcing frame is preferably from 1 to 50 mm. The lower limit of the width is more preferably 5 mm or more, still more preferably 10 mm or more. The upper limit of the width is more preferably 40 mm or less, still more preferably 30 mm or less, most preferably 20 mm or less.

[Pleated Functional Element]

The reinforcing frame is secured to the pleated structure around a periphery thereof, to thereby form a pleated functional element. A pleated functional element is classified into the cylinder type pleated functional element and the plane type pleated functional element, depending on the shape thereof.

The "cylinder type pleated functional element" is formed by adhering to each other both ends of the humidifying membrane, which extend in parallel to the pleats, to thereby form a cylindrical body, and securing two reinforcing frames (generally donut-shaped reinforcing frames), respectively, to both ends of the obtained cylindrical body, which extend perpendicularly to the pleats. On the other hand, in the "plane type pleated functional element", both ends of the humidifying membrane, which extend in parallel to the pleats, are not adhered to each other. The plane type pleated functional element has a reinforcing frame (generally a rectangular reinforcing frame) having two pairs of opposite inner faces, wherein one pair of the opposite inner faces are secured to the ends of the humidifying membrane, which extend perpendicularly to the pleats, and the other pair of the opposite inner faces are secured to the ends of the humidifying membrane, which extend in parallel to the pleats. The difference between the cylinder type pleated functional element and the plane type pleated functional element is whether or not both ends of the humidifying membrane, which extend in parallel to the pleats, are adhered to each other. A pleated functional element in which both ends of the humidifying membrane, which extend in parallel to the pleats, are not adhered to each other, is included in the plane type pleated functional element, irrespective of the shape thereof.

As can be presumed from the structure of the cylinder type pleated functional element, which has a hollow (dead space) around the central axis thereof, the volume efficiency of the cylinder type pleated functional element is, theoretically, lower than that of the plane type pleated functional element. However, the cylinder type pleated functional element is advantageous in that the number of sealed portions is small, as compared to that of the plane type pleated functional element, and, thus, can be preferably used depending on the application. In a general application (such as a fuel cell for automobiles), it is preferred to use the plane type pleated functional element, which does not have such a dead space.

Figure 3A:
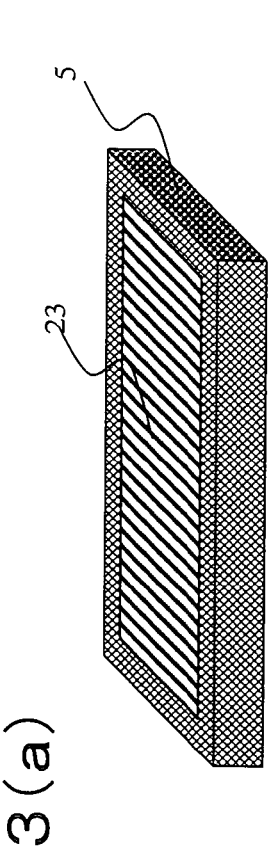
FIG. 3(*a*) is a diagrammatic view of an example of a plane-type pleated functional element which can be suitably used in the present invention.
Figure 3B:
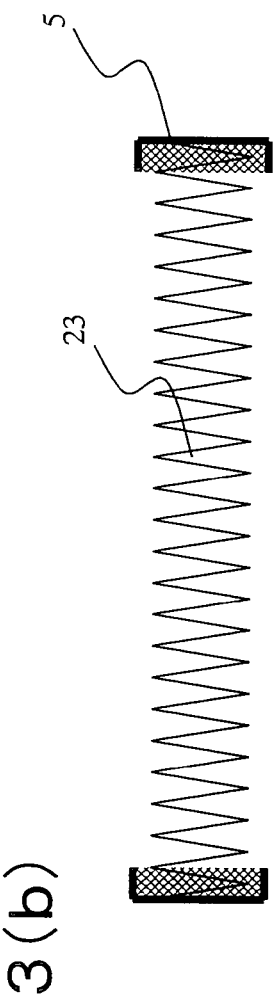
Figure 3C:
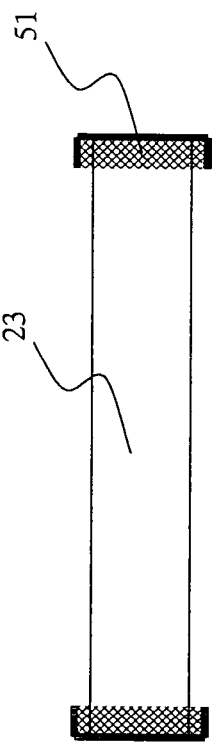
Figure 15A:
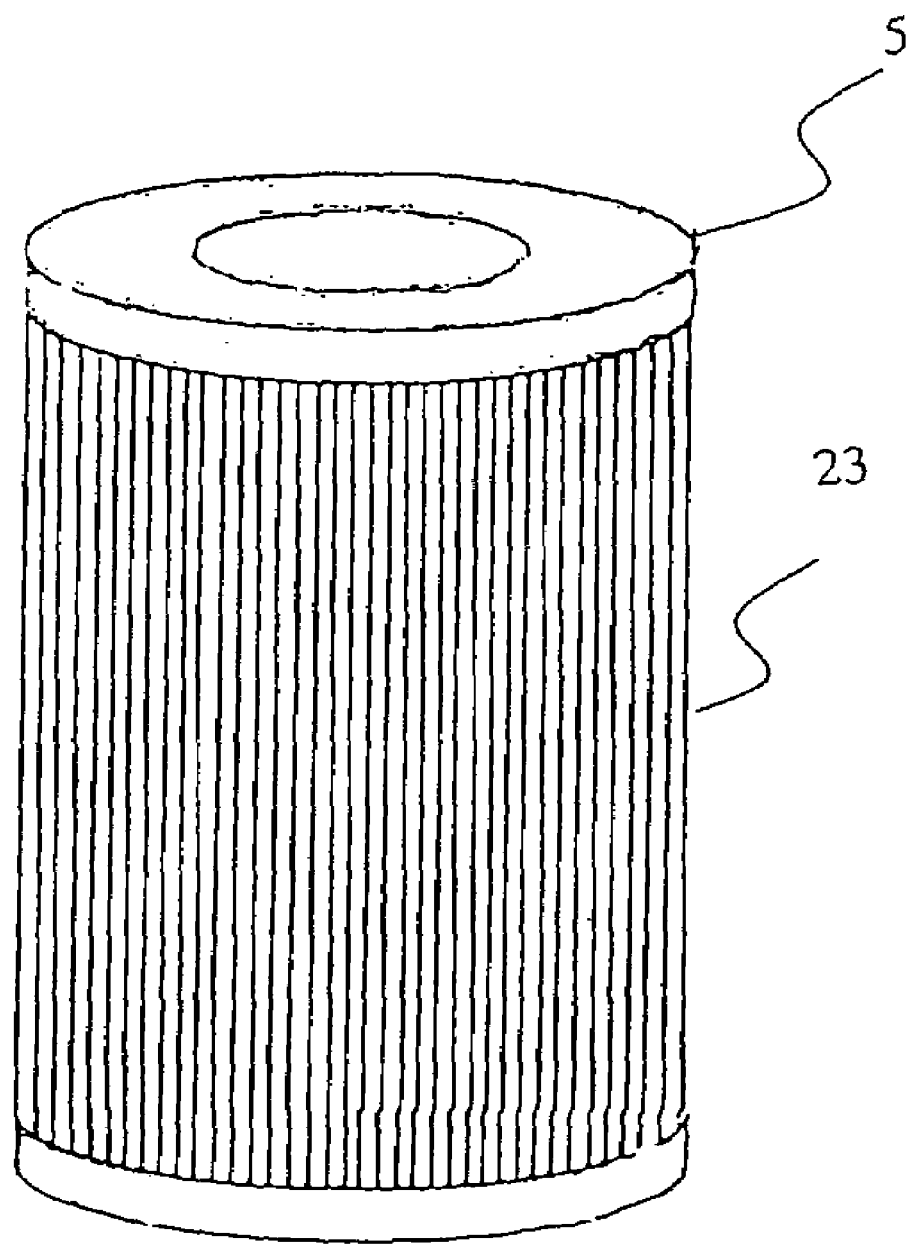
FIG. 15(a) is a diagrammatic view of an example of a cylindrical, pleated functional element used in the present invention.

FIG. 3(a) is a diagrammatic view of an example of a plane type pleated functional element, and FIG. 15(a) is a diagrammatic view of an example of a cylinder type pleated functional element. FIGS. 3(b) and 15(b) are, respectively, diagrammatic cross-sectional views of the pleated functional elements shown in FIGS. 3(a) and 15(a), each taken along a line perpendicular to the direction of the pleats, and FIGS. 3(c) and 15(c) are, respectively, diagrammatic cross-sectional views of the pleated functional elements shown in FIGS. 3(a) and 15(a), each taken along a line parallel to the direction of the pleats. As an example of a method for adhering the periphery of pleated structure 23 to the inner surface of reinforcing frame 5, there can be mentioned a method in which adhesive 51 is poured onto the inner surface (having a channel-shaped cross-section) of reinforcing frame 5, and then pleated structure 23 is inserted thereinto, followed by curing or heat sealing.

Each of FIGS. 4(a) to 4(d) and 5(a) to 5(d) is a diagrammatic view of an example of the sealing material used for the plane type pleated functional element. Each of FIGS. 4(a) and 5(a) is a diagrammatic cross-sectional view of a sealing material, taken along a line perpendicular to the direction of the pleats; each of FIGS. 4(b) and 5(b) is a diagrammatic cross-sectional view of a sealing material, taken along a line parallel to the direction of the pleats; each of FIGS. 4(c) and 5(c) is a diagrammatic outside view of a sealing material, as viewed along a line parallel to the direction of the pleats; and each of FIGS. 4(d) and 5(d) is a diagrammatic outside view of a sealing material, as viewed along a line perpendicular to the direction of the pleats. In FIGS. 4(a) to 4(d), sealing material 7 is applied to the entire outer surfaces of the non-bent portions of the reinforcing frame. In FIGS. 5(a) to 5(d), sealing material 7 is applied to the entire outer surfaces of the bent portions of the reinforcing frame. Alternatively, the sealing material may be applied onto a housing instead of the reinforcing frame, or the sealing material may be applied to both of a housing and the reinforcing frame. Further, when the gas-tightness of the humidifying apparatus is ensured by another means, it is possible not to apply the sealing material to any of the housing and the reinforcing frame.

As sealing material 7, there can be used any sealing material which does not adversely affect the objects of the present invention. Examples of sealing materials include an O-ring, a rubber sheet, a metal sheet and an adhesive. Among these, an O-ring and a rubber sheet are preferred. When an O-ring is used as sealing material 7, it is preferred that the housing or the reinforcing frame is subjected to fluting, so as to secure the o-ring in the fluting formed. When a rubber sheet having a large thickness is used as sealing material 7, there is a possibility that the rubber sheet is pushed out by the internal pressure of the humidifying apparatus. Therefore, it is preferred that the thickness of the rubber sheet is not more than 5 mm, more advantageously not more than 3 mm, most advantageously 1 mm.

The pleats pitch (P) of the pleated structure is the distance between mutually adjacent pleat apexes of the pleated structure. When the pitches of the pleat apexes are not uniform, an average value of the pitches is defined as the pleats pitch (P). The pleats pitch (P) is preferably from 0.1 to 10 mm. The lower limit of the pleats pitch (P) is more preferably 0.4 mm or more, still more preferably 0.6 mm or more, still more preferably 0.8 mm or more, most preferably 1.0 mm or more. The upper limit of the pleats pitch (P) is more preferably 8 mm or less, still more preferably 6 mm or less, still more preferably 4 mm or less. The pleats pitch (P) can be adjusted depending on the inner width of the reinforcing frame and the desired number of pleats to be accommodated.

The ratio (M) of the pleats pitch (P) of the pleated structure to the thickness (T) of the humidifying membrane/reinforcing layer structure (i.e., pleated structure) is preferably in the range of from 0.5 to 3.0. The lower limit of the ratio (M) is more preferably 0.8 or more, still more preferably 1.0 or more, still more preferably 1.2 or more, still more preferably 1.4 or more, most preferably 1.6 or more. The upper limit of ratio (M) is more preferably 2.5 or less, still more preferably 2.2 or less, still more preferably 2.1 or less, still more preferably 2.0 or less, most preferably 1.9 or less. When the ratio (M) is less than 0.8, the pleats pitch (P) becomes disadvantageously small so that the gas permeability of the pleated structure is likely to be lowered, leading to a lowering of the humidifying function. On the other hand, when the ratio (M) is more than 3.0, the pleats pitch (P) becomes too large, resulting in disadvantages not only in that the membrane area which can be accommodated in a unit area becomes small, but also in that vigorous flattering of the humidifying membrane/reinforcing layer structure (i.e., pleated structure) occurs, so that the humidifying membrane/reinforcing layer structure undergoes mutual friction and, hence, is likely to be abraded or broken, and also both fixed ends of humidifying membrane/reinforcing layer structure flattering vigorously sustain large stress and, hence, are likely to be broken.

When the ratio (M) is 2.0, it means that mutually adjacent folded surfaces of the humidifying membrane/reinforcing layer structure in the pleated structure are in contact with each other. When the ratio (M) is less than 2.0, it means that the humidifying membrane/reinforcing layer structure in the pleated structure is compressed to be thinner than the original thickness thereof. FIG. 2(a) is a diagrammatic view of an example of a pleated structure wherein the humidifying membrane/reinforcing layer structure has a cross-section in which V-shapes are connected in series. The ratio (M) of this pleated structure shown in FIG. 2(a) is 3.0. FIG. 2(b) is a diagrammatic view of an example of a pleated structure wherein the humidifying membrane/reinforcing layer structure has a cross-section in which U-shapes are connected in series. The ratio (M) of this pleated structure shown in FIG. 2(a) is 2.0.

It is preferred that the pleated functional element has a buckling strength of 10 kPa or more, more advantageously 20 kPa or more, still more advantageously 40 kPa or more, still more advantageously 60 kPa or more, still more advantageously 80 kPa or more, most preferably 100 kPa or more. The buckling strength of the pleated functional element is measured in accordance with JIS K-7220. More specifically, the bucking strength is defined as the stress sustained by a pleated functional element which has been compressed in the direction of the height of the pleats at a compression rate of 5%/sec to a deformation ratio of 10%.

A typical pleated functional element is rectangular and has a long side and a short side. For improving the pressure resistance of the humidifying apparatus by reducing the distance between the beams of the housing, it is preferred that the short side of the pleated functional element is not longer than required. The length of the short side is preferably 300 mm or less, more preferably 250 mm or less, still more preferably 200 mm or less, still more preferably 150 mm or less, most preferably 100 mm or less. Even when it is not required to reduce the distance between the beams of the housing, it is preferred that the short side of the pleated functional element is 1,000 mm or less, more advantageously 500 mm or less. With respect to the distance between the beams of the housing, an explanation is given below.

[Humidifying Element]

A humidifying element is constructed by providing a gas-intake, a gas-outlet, a dry-side channel and a wet-side channel to a pleated functional element (hereinafter, a gas-intake, a gas-outlet, a dry-side channel and a wet-side channel are collectively called "channels").

FIG. 6(a) is a diagrammatic view of the pleated functional element before the channels are provided around it. Each of FIGS. 6(b) and 6(c) is a diagrammatic view of an example of a humidifying element used in the present invention. In FIGS. 6(b) and 6(c), the portion indicated by character E is the humidifying element. In FIGS. 6(b) and 6(c), broken lines and solid lines indicate a wet-side channel and a dry-side channel, respectively.

FIG. 6(b) shows an example of a humidifying element in which a channel providing means 70 is used to provide a channel above the surface of the pleated functional element. An example of channel providing means is a sheet-like material obtained by forming two openings (for a gas-intake and a gas-outlet) in a highly flexible material, such as a urethane foam sheet. By attaching such a channel providing means onto the surface of the pleated functional element 6, a channel is formed above the surface of the pleated functional element 6. The humidifying element shown in FIG. 6(b) is connected to the housing 8 through the sealing material 7. The housing 8 shown in FIG. 6(b) provides the humidifying element with auxiliary functions, i.e., functions other than the humidifying function, specifically, for example, the function of protecting against mechanical destruction and the function of connecting the humidifying element to outside conduits.

FIG. 6(c) shows an example of a humidifying element in which, instead of a channel providing means 70, the housing 8 is used to provide a channel above the surface of the pleated functional element. The housing 8 shown in FIG. 6(c) not only provides the humidifying element with the above-mentioned auxiliary functions (i.e., functions other than the humidifying function), but also constitutes a part of the channels. Since the housing 8 shown in FIG. 6(c) constitutes a part of the channels, the housing 8 in this case can be regarded to provide a part of the humidifying function.

In the case of the construction shown in FIG. 6(c), a space is provided between the pleated functional element and the inner surface of the housing. In the present invention, this space is referred to as a "spatial channel", and a channel in the pleated functional element is referred to as "intra 'pleated-functional-element' channel". When the humidifying element has a spatial channel, the gas flow resistance in the spatial channel can be adjusted by placing a gas channel-control means in the spatial channel. For example, when the gas flow resistance of the spatial channel is increased, the pressure loss in the spatial channel is increased; however, since the gas flow introduced into the intra 'pleated-functional-element' channel is also increased in this case, the humidifying performance can be improved. Preferred examples of channel gas flow control means include a plate, a resin net and a metal net.

[Humidifying Element Having a Spatial Channel]

Figure 2C:
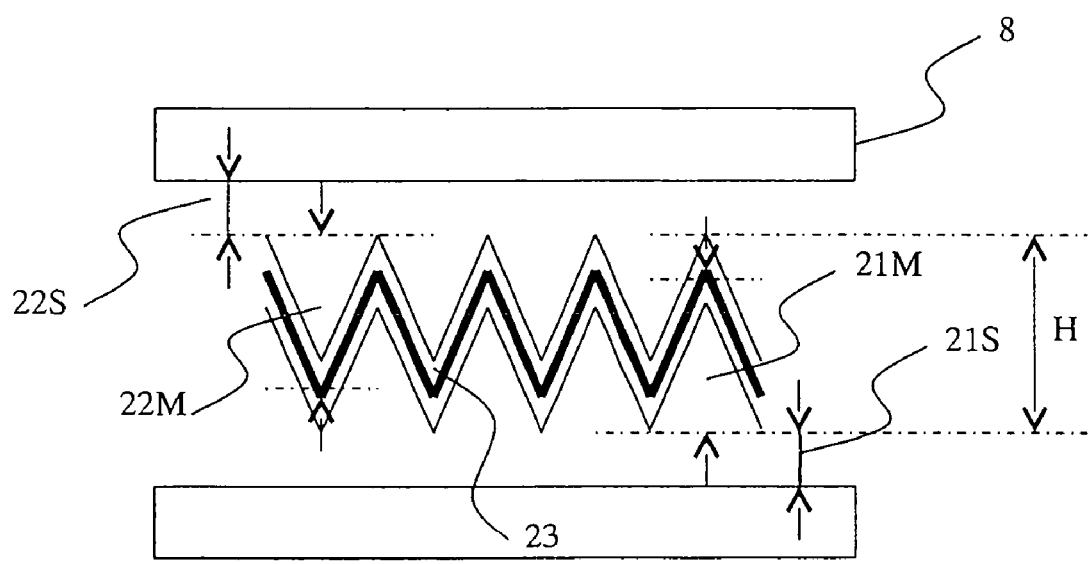

FIG. 2(c) is a diagrammatic view of the construction of a humidifying element having the spatial channels. The dry-side channel 21 is comprised of the spatial channel 21S and the intra 'pleated-functional-element' channel 21M, and the wet-side channel 22 is comprised of the spatial channel 22S and the intra 'pleated-functional-element' channel 22M. Character H indicates the height of the pleated structure.

With respect to each of the wet-side channel and the dry-side channel, it is preferred that the ratio (C) of the height of channel to the height of pleat, i.e., [(H+S)/H] is from 1.0 to 5.0. Herein, the term "height of channel" means a total of (the height H of the pleated structure) and (the height S of the space on the wet-side channel or the dry-side channel). For example, in FIG. 2(c), the term "height S of the space" means the height of the spatial channel 22S or 21S. It is preferred that the upper limit of the ratio (C) is 2.0 or more, more advantageously 1.5 or less, still more advantageously 1.2 or less, still more advantageously 1.1 or less, still more advantageously 1.05 or less. When the ratio C is 1.0, it means that the space providing means is in contact with the surface of the humidifying element. When the ratio (C) is more than 10, much of the gas introduced through the gas-intake flows only through the spatial channel, thus rendering it difficult to exhibit a satisfactory humidifying performance.

It is preferred that the ratio (V) of the volume of wet-side channel to the volume of dry-side channel, i.e., [(H+22S)/(H+21S)] is from 0.5 to 100. Herein, each of the terms "volume of wet-side channel" and "volume of dry-side channel" means a total of (the volume of the pleated structure (excluding the volume of a portion not contributing to the transfer of water vapor, such as terminal adhesion portions)) and (the volume of the spatial channel). It is preferred that the lower limit of the ratio (V) is 0.8 or more, more advantageously 1.5 or more, still more advantageously 2.0 or more. It is preferred that the upper limit of the ratio (V) is 50 or less, more advantageously 20 or more, still more advantageously 10 or less, still more advantageously 5 or less. When the ratio (V) is less than 0.5, the pressure loss in the wet-side channel becomes too large, as compared to the pressure loss in the dry-side channel. When the ratio V is more than 100, the pressure loss in the dry-side channel becomes too large, as compared to the pressure loss in the wet-side channel.

[Gas-Intake and Gas-Outlet of Humidifying Element]

Figure 7:
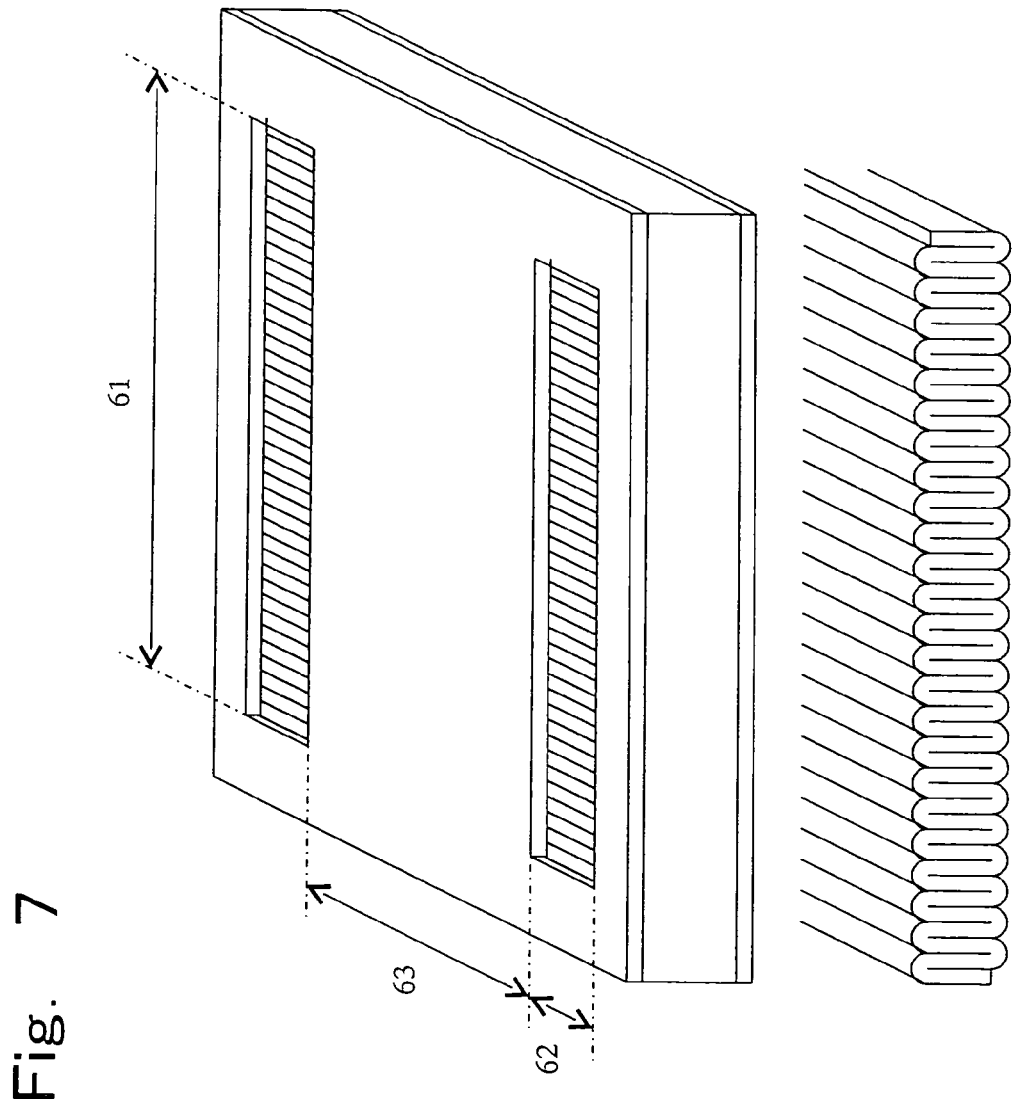
FIG. 7 is a diagrammatic view showing an example of the positional relationship between a gas-intake and a gas-outlet of the humidifying element in the case where a plane-type pleated functional element is used in the present invention.

The humidifying element used in the present invention is provided, on opposite sides thereof, with at least one pair of a gas-intake and a gas-outlet. In the present invention, from the viewpoint of the efficiency of use of a humidifying membrane, it is preferred that a gas is evenly distributed in the widthwise direction (i.e., a direction perpendicular to the pleats) of the humidifying element. FIG. 7 is a diagrammatic view showing the positional relationship between a gas-intake and a gas-outlet of the humidifying element.

It is preferred that the width 61 of the gas-intake or gas-outlet is 50% or more, more advantageously 80% or more, still more advantageously 90% or more, still more advantageously 95% or more, based on the inner width of the humidifying element.

It is preferred that the cross-sectional area of the gas-intake or gas-outlet is 10% or more, more advantageously 20% or more, still more advantageously 50% or more, still more advantageously 100% or more, still more advantageously 200% or more, most advantageously 300% or more, based on the cross-sectional area of an outside conduit.

A preferred range of the length 62 of the gas-intake or gas-outlet can be calculated from the above-mentioned width and cross-sectional area. In general, a preferred range of the length 62 is calculated to be in the range of from 1 mm to 1 m. The lower limit of the length 62 is preferably 5 mm or more, more preferably 10 mm or more, still more preferably 15 mm or more. The upper limit of the length 62 is preferably 20 cm or less, more preferably 10 cm or less, still more preferably 5 cm or less. When the length 62 is more than 1 m, the pressure loss tends to become disadvantageously large.

The shape of the gas-intake and gas-outlet can be arbitrarily selected from various shapes, such as a rectangle, an ellipse, a rhomboid, a trapezoid and combinations thereof, so long as the size of the gas-intake and gas-outlet is in the above-mentioned ranges. When the shape of the gas-intake or gas-outlet is a rectangle having its lengthwise direction positioned in parallel to the widthwise direction of the humidifying element, it is preferred that the two short sides of the rectangle are not straight lines, but semicircles, since in such case, the machining for producing the gas-intake and gas-outlet becomes easy.

[Division of Channels]

In the humidifying apparatus of the present invention, it is necessary that the membrane area of the humidifying membrane be appropriately adjusted, depending on the required performance. When high performance is required, so that a large membrane area is necessary, it becomes necessary to increase the size (i.e., lengthen the long sides and/or short sides) of the pleated functional element. However, as mentioned above, from the viewpoint of reducing the distance between the beams of the housing and the viewpoint of reducing the pressure loss, it is preferred that the short sides of the pleated functional element are not longer than required. Therefore, in some cases where a large membrane area is necessary, the long sides may inevitably become markedly long. In such cases, by performing a "division of channels", it becomes possible to downsize the humidifying element while maintaining the basic performance thereof.

As a method for dividing channels, there can be mentioned a method in which the pleated functional element is physically divided into two or more bodies in the direction of the long sides thereof, so as to construct a humidifying apparatus having a plurality of pleated functional elements. However, in this method, it is necessary to provide a gas-intake, a gas-outlet, and outside conduits or the like for each pleated functional element, so that the humidifying apparatus as a whole becomes complicated. In the present invention, the "division of channels" encompasses the above-mentioned method; however, it is more preferred to employ the following method.

In the preferred method of the division of channels, instead of physically dividing the pleated functional element, the short sides of the pleated functional element are lengthened to an extent where no problems are caused, while the long sides of the pleated functional elements are shortened. Needless to say, by modifying the shape of the pleated functional element as described above, the distance between the gas-intake and the gas-outlet (i.e., reference numeral 63 in FIG. 7) becomes larger, so that there is a danger that the pressure loss and the humidifying performance are adversely affected. Therefore, in this method, when the shape of the pleated functional element is modified as described above, an additional gas-intake and/or gas-outlet is provided between the gas-intake and the gas-outlet. With respect to this preferred method, an explanation is given below with reference to FIGS. 8(a) to 8(d).

FIG. 8(a) is a diagrammatic plan view of a pleated functional element having an inner length of X mm and an inner width of Y mm (hereinafter, this pleated functional element is referred to as "pleated functional element A"), and FIG. 8(b) is a diagrammatic view showing the positions of the gas-intake and gas-outlet of pleated functional element A, as in the case where pleated functional element A is provided with two openings (as the gas-intake and the gas-outlet), each having the same inner width as pleated functional element A and an inner length of Z mm. Herein, the terms "inner length" and "inner width" of a pleated functional element respectively mean the width and length of the pleated functional element exclusive of the reinforcing frame.

Figure 8C:
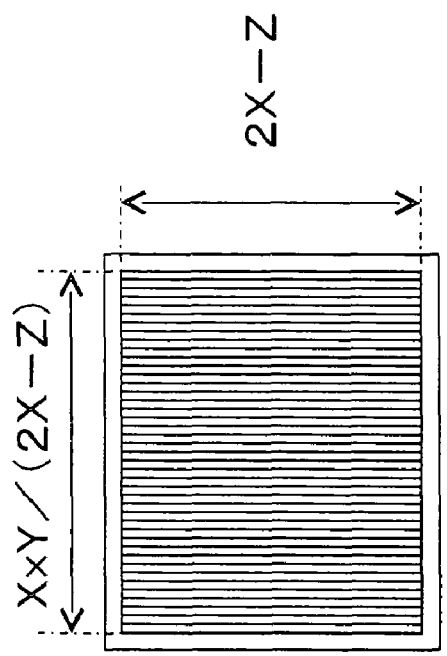
FIG. 8(c) is a diagrammatic plan view of the pleated functional element (shown in FIG. 8(a)) having an inner length of X and an inner width of Y, as in the case where the dry-side channel or the wet-side channel is divided into two sub-channels.
Figure 8D:
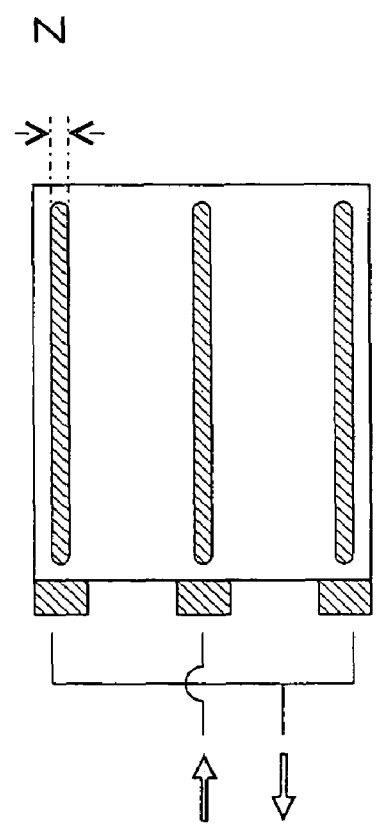
FIG. 8(d) is a diagrammatic view showing an example of the positions of the gas-intake and gas-outlet of the pleated functional element (shown in FIG. 8(a)) having an inner length of X and an inner width of Y, as in the case where the dry-side channel or the wet-side channel is divided into two sub-channels.

As an example of a humidifying element in which the lengths of the long sides and short sides of the pleated functional element have been adjusted and the channels have been divided into sub-channels so that the humidifying element exhibits the same humidifying performance as that of a humidifying functional element containing pleated functional element A, there can be mentioned a humidifying element as shown in FIGS. 8(c) and 8(d). FIG. 8(c) is a diagrammatic plan view of a pleated functional element having an inner length of (2X−Z) mm and an inner width of {(X×Y)/(2X−Z)} mm (hereinafter, this pleated functional element is referred to as pleated functional element B). FIG. 8(d) is a diagrammatic view showing an example of the positions of the gas-intake and gas-outlet of pleated functional element B, as in the case where pleated functional element B is provided with three openings (as the or each gas-intake and the or each gas-outlet), each having the same inner width as in pleated functional element B and an inner length of Z mm. In the case as shown in FIG. 8(d), the two outer openings of the three openings are connected to an outside conduit through a branching means. On the other hand, the middle opening of the three openings is directly connected to another outside conduit. In such a case, there are two gas-intakes (or gas-outlets) on the wet-side or the dry-side, namely, the wet-side channel or the dry-side channel is divided into two sub-channels. As can be seen from FIGS. 8(a) to 8(d), the distance between the gas-intake(s) and the gas-outlet(s) in the case of FIG. 8(d) is the same as that in the case of FIG. 8(b). In the case of FIG. 8(d), when Z is relatively small as compared to X, the width of one wet-side or dry-side channel is (X×Y)/(2X−Z)≈Y/2, and, thus, the total width of two wet-side or dry side channels is (Y/2)×2=Y, which is the same as the width of one wet-side or dry-side channel in the case of FIG. 8(a). The present inventors have found that the above-mentioned pleated functional elements A and B have the same level of water vapor exchange ability (see Examples 1 and 2 below). (With respect to the "water vapor exchange ability", an explanation is given below.) When a comparison is made between the above-mentioned method in which a pleated functional element as shown in FIGS. 8(a) and 8(b) is provided with additional gas-intake(s) and gas-outlet(s) as shown in FIGS. 8(c) and 8(d), and the above-mentioned method in which a pleated functional element is physically divided into two bodies, the former is advantageous in that mutually adjacent channels can share one opening (i.e., the middle opening of the three openings in the above-mentioned example), so that the humidifying apparatus as a whole can be downsized.

When either of the dry-side channel and the wet-side channel is divided into two sub-channels, the humidifying element has three openings parallel to each other. When either of the dry-side channel or the wet-side channel is divided into three sub-channels, the humidifying element has four openings parallel to each other. In a humidifying element, the dry-side channel and the wet-side channel may be divided into different number of sub-channels. For example, when either of the dry-side channel and the wet-side channel is divided into two sub-channels and the other of the dry-side channel and the wet-side channel is divided into three sub-channels, the channel divided into two sub-channels has three openings, and the channel divided into three sub-channels has four openings.

When it is intended to connect the humidifying apparatus of the present invention to one fuel cell, as shown in FIG. 1, there are only two outside conduits (for the gas-intake and the gas-outlet) on each of the dry side and the wet side. Therefore, when three or more openings are provided on either of the dry-side and the wet-side of the humidifying element, it is necessary to connect the three or more openings to the two outside conduits using a branching means. With respect to such branching means, there is no particular limitation. Any branching means can be used in any combination depending on the purpose, as long as it is geometrically possible. In the present invention, such branching means is referred to as a "connecting conduit".

[Housing]

When a humidifying element is accommodated in or connected to a housing, the humidifying element is provided with auxiliary functions (e.g., the function of protecting against mechanical destruction and the function of connecting the humidifying element to outside conduits), so as to constitute a humidifying apparatus which exhibits all required functions. In the present invention, a housing is preferably used in many cases.

As a housing, there is conventionally known a "container type housing" used in the field of air filters, which can accommodate an entire pleated functional element. However, in the present invention, a "plate type housing" can be preferably used, wherein the reinforcing frame of the pleated functional element is used as a part of the housing, and the pleated functional element is sandwiched between two opposite pressure plates, which are gas-tightly attached to the ends of the reinforcing frame, thereby constituting an gas-tight casing.

Figure 10B:
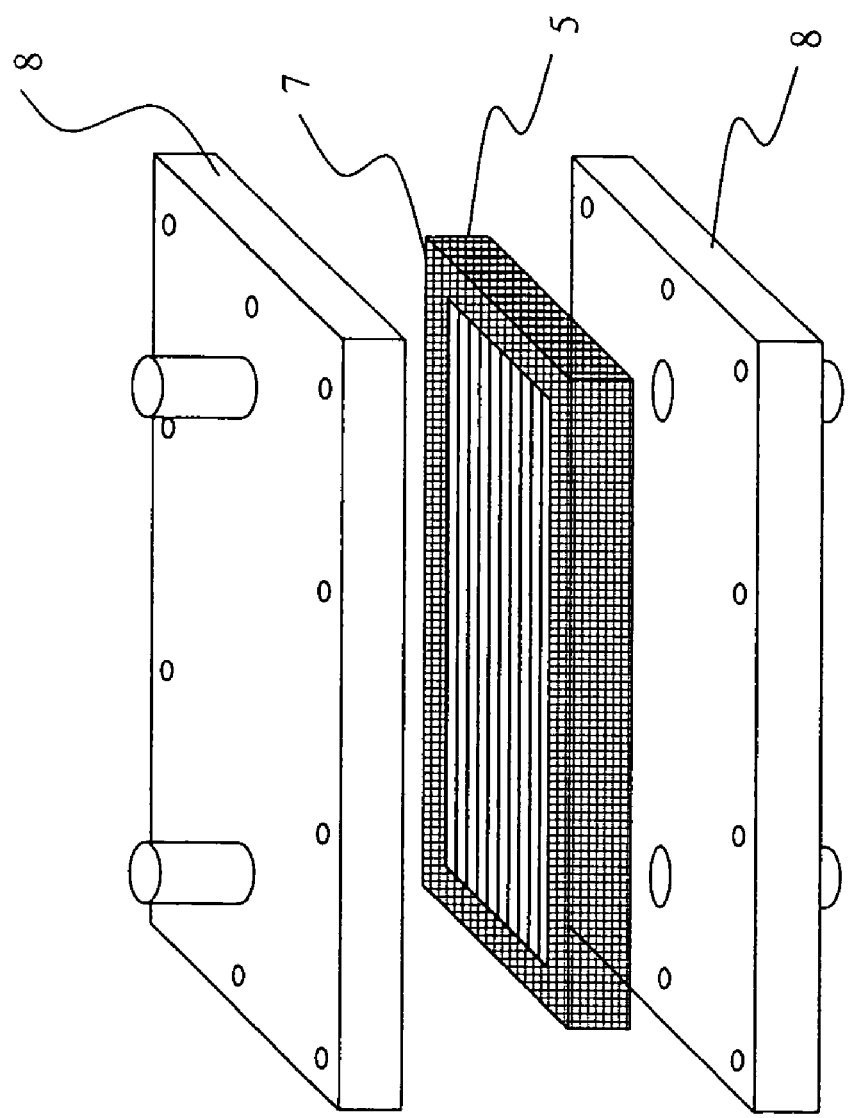
FIG. 10(b) is a diagrammatic exploded view of the pressure-plate type housing (shown in FIG. 10(a))

FIGS. 10(a) and 10(b) are diagrammatic views showing a pressure-plate type housing, which can be preferably used in the present invention.

When the humidifying apparatus is constructed as shown in FIGS. 10(a) and 10(b), it becomes easy to greatly simplify the housing. Further, by virtue of such a construction as shown in FIGS. 10(a) and 10(b), the reinforcing frame (having a predetermined high strength), instead of the pleated structure, can support the stress sustained by the pleated functional element sandwiched between the pressure plates, thereby enabling the construction of a durable humidifying apparatus which can stand even a high-pressure gas. Furthermore, the use of a pressure-plate type housing is advantageous in that it becomes easier to disassemble the humidifying apparatus, so that the maintenance of the humidifying apparatus becomes very easy, despite the compact construction of the humidifying apparatus.

FIG. 10(a) is a perspective view of an example of the humidifying apparatus of the present invention, and FIG. 10(b) is a diagrammatic exploded view of the humidifying apparatus shown in FIG. 10(a). FIG. 11(a) is a diagrammatic cross-sectional view of the humidifying apparatus shown in FIG. 10(a), taken along a line parallel to the direction of the pleats, and FIG. 11(b) is a diagrammatic cross-sectional view of the humidifying apparatus shown in FIG. 10(a), taken along a line perpendicular to the direction of the pleats.

Two pressure plates 8 are gas-tightly attached to pleated functional element 6 through reinforcing frame 5. In FIG. 11(a), as a means for gas-tightly attaching the pressure plates to the pleated functional element, pressuring means comprising a plurality of stud bolts 81 are provided at the peripheral portions of the pressure plates. As examples of pressurizing means, there can be mentioned various conventional means including joining means (e.g., adhesion and welding). Alternatively, the pressure plates may be gas-tightly attached to the pleated functional element by using structural members (such as clamps) provided on the outer surfaces of the pressuring plates.

In FIG. 11(a), with respect to the upper-side and lower-side channels separated by the humidifying membrane, the lower-side channel is designated as "dry-side channel 21", and the upper-side channel is designated as "wet-side channel 22". However, the positions of the dry-side channel and the wet-side channel may be mutually inverted arbitrarily, depending on the desired use. Dry-side channel 21 and wet-side channel 22 are gas-tightly separated from each other by humidifying membrane/reinforcing layer structure 23, reinforcing frame 5, pressure plates 8 and, optionally, sealing material 7 which is interposed between reinforcing frame 5 and pressure plate 8. Dry-side channel 21 is connected to dry-side gas-intake 211 and dry-side outlet 212, and wet-side channel 22 is connected to wet-side gas-intake 221 and wet-side gas-outlet 222.

A moist gas which is fed from wet-side gas-intake 221 flows through wet-side channel 22 (indicated by a dotted line in FIG. 11(a)) from the left-hand side to the right-hand side and is exhausted from wet-side gas-outlet 222. On the other hand, a dry gas which is fed from dry-side gas-intake 211 flows through dry-side channel 21 (indicated by a solid line in FIG. 11(a)) from the right-hand side to the left-hand side and is exhausted from dry-side gas-outlet 212. During the above-described process, the water vapor contained in the moist gas is transferred to the dry gas through the humidifying membrane.

With respect to the structure of the pressure plate, there is no particular limitation, so long as it does not depart from the object of the present invention. A pressure plate can be produced, for example, by subjecting a flat plate having a thickness of from 0.1 to 50 mm to various appropriate processings. As materials of the pressure plate, various materials, such as stainless steel, aluminum and plastics, can be used. Further, if desired, the weight of the pressure plate can be reduced by using conventional materials technology, such as the use of a rib or a honeycomb-structured material. For improving the sealability of the surface of the pressure plate which is placed in contact with the humidifying element, it is preferred that the surface of the pressure plate which is placed in contact with the humidifying element is satisfactorily smooth.

Figure 12A:
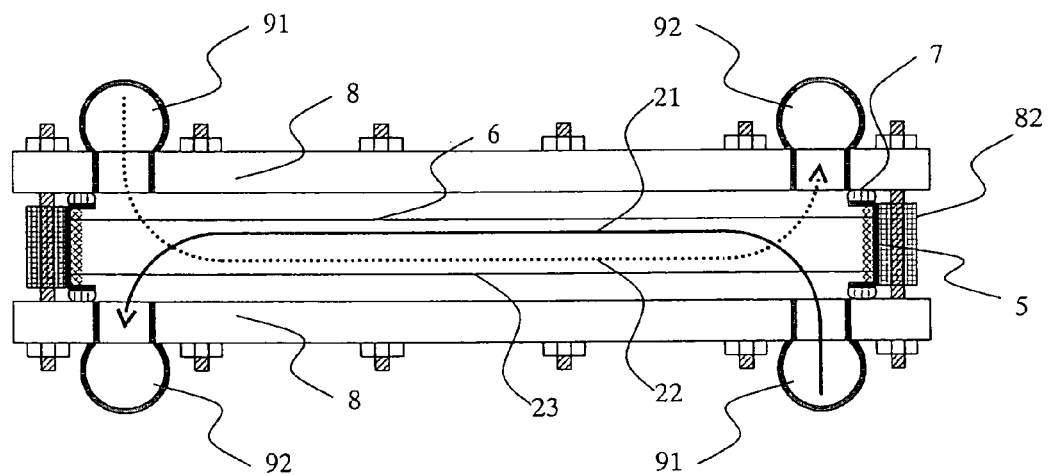
FIG. 12(a) is a diagrammatic cross-sectional view of an example of the humidifying apparatus of the present invention employing a pressure-plate type housing, taken along a line parallel to the direction of the pleats.

When the gas used has a high pressure, there is a danger that even a reinforcing frame having a thickness within the range mentioned above is deformed under the gas pressure. In such a case, a reinforcing material 82 (as shown in FIG. 12(a)) can be provided at the peripheral portions of the humidifying element.

When two pressure plates 8 are gas-tightly attached to pleated functional element 6 through reinforcing frame 5, if desired, sealing material 7 may be interposed between pressure plates 8 and reinforcing frame 5.

[Housing and Pressure-Buffering Means]

In the present invention, especially in the case where the width of the gas-intake provided in association with the pleated functional element is larger than the diameter of an outside conduit, when the outside conduit is connected to the center of the humidifying element, there is a danger that most of the gas flow is concentrated at the connection portion, thus rendering it impossible to supply a satisfactory gas flow to the humidifying membrane at the peripheral portions of the humidifying element. As an example of the above-mentioned case, there can be mentioned a case where, in FIG. 10(a), the inner diameters of conduits (indicated with 211 and 221) for gas-intakes and conduits (indicated with 212 and 222) for gas-outlets are considerably small as compared to the widths of the gas-intakes provided in association with the pleated functional element. In such a case, it is necessary that a pressure-buffering means be provided between the gas inlet of the outside conduit and the gas-intakes provided in association with the pleated functional element. In the present invention, "pressure-buffering means" is a generic term for a gas-flow buffering means which is used for preventing the occurrence of the above-mentioned concentration of a gas flow at the gas-intake and gas-outlet of the humidifying element. A pressure-buffering means is provided between the outside conduits and gas-intakes and between the outside conduits and gas-outlets. The pressure-buffering means is a part of the housing and contributes to a part of the auxiliary functions of the housing. In the present invention, the pressure-buffering means is preferably used in most cases.

The pressure-buffering means has opening A on the outside conduit side thereof and opening B on the humidifying element side thereof. Opening A has the same shape as the outside conduit and opening B has the same shape as the gas-intake and the gas-outlet of the humidifying element. In many cases, the width of opening B is larger than that of opening A. When the width of opening B is close to that of opening A, the pressure-buffering means can be omitted.

With respect to the structure of the pressure-buffering means, there is no particular limitation, as long as it has the effect of rectifying the gas flow. For example, the following structures can be preferably used: (1) a pipeline connecting opening A and opening B, wherein the distance between the openings A and B is relatively large; (2) a pipeline connecting opening A and opening B, wherein a filter comprised of a nonwoven fabric or a net is provided in the pipeline for the purpose of pressure buffering; and (3) a structure in which the directions of the gas flows at opening A and opening B become perpendicular to each other. These structures are advantageous in that the pressure distribution and velocity distribution of the gas flow at opening B become relatively uniform, thereby rendering it possible to effectively utilize the humidifying membrane over the entire pleated functional element. Among the above-mentioned structures (1) to (3), structure (3) is preferred from the viewpoint of compactness of the structure and small pressure loss. The above-mentioned expression "perpendicular to each other" is used in connection with the concept of turning the direction of the gas flow, and may include not only an angle of 90°, but also an angle in the range of from 30° to 150°.

Figure 12B:
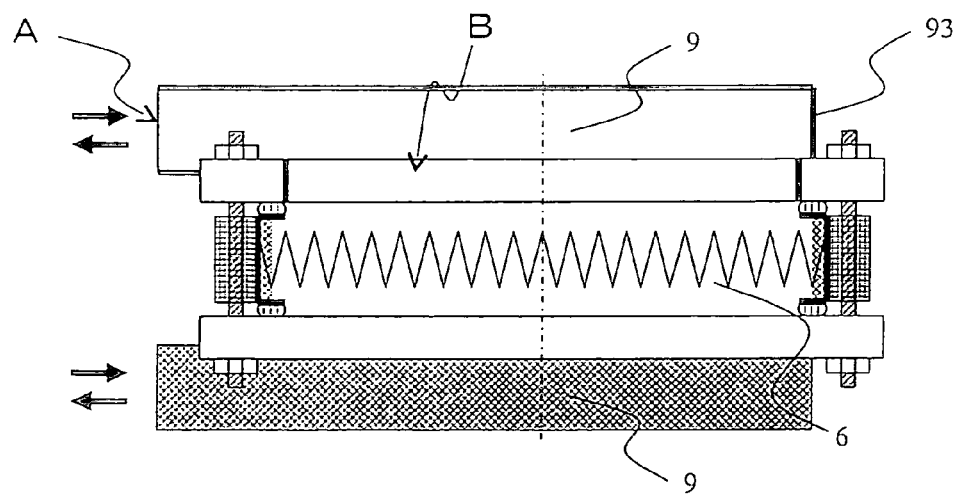
FIG. 12(b) is a diagrammatic cross-sectional view of an example of the humidifying apparatus of the present invention employing a pressure-plate type housing, taken along a line perpendicular to the direction of the pleats.

For example, as shown in FIGS. 12(a) and 12(b) (described below), in the wet-side channel indicated by a dotted line, when a gas is fed from an outside conduit and flowed through opening 91 (i.e., opening A in FIG. 12(b)) of a pipeline (on the left-hand side in FIG. 12 (a)), the gas collides with face 93 of a metal plate which is opposite to opening A and which closes the pipeline, thereby forming a relatively uniform pressure field in the pipeline. After the gas collides with face 93, the gas is introduced into the humidifying element through an opening B provided at a bottom portion of the pipeline. Water vapor contained in the gas is transferred through the humidifying membrane to the dry-side channel, and the resultant water vapor-depleted gas is exhausted to the inside of a pipeline on the right-hand side in FIG. 12(a) through another opening B provided at a bottom portion of the pipeline on the right-hand side in FIG. 12(a). The water vapor-depleted exhausted gas forms a relatively uniform pressure field in the pipeline, and is then exhausted through opening A (i.e., opening 92) to an outside conduit.

Figure 13A:
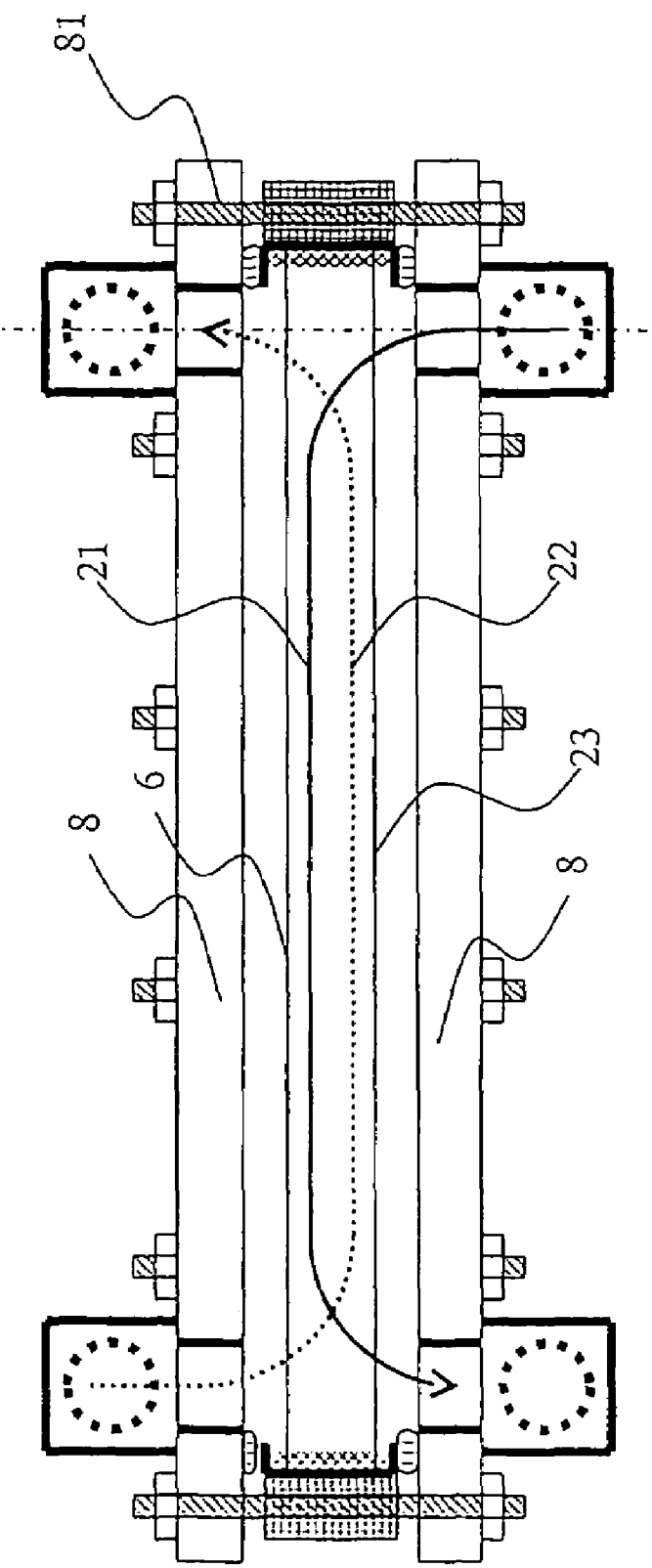
FIG. 13(a) is a diagrammatic cross-sectional view of an example of a humidifying element (used in the present invention) divided into two parts, taken along a line parallel to the direction of the pleats.

FIGS. 12(a) and 12(b) are diagrammatic views of an example of the pressure-buffering means. More specifically, FIG. 12(a) is a diagrammatic cross-sectional view of an example of the humidifying apparatus of the present invention employing a pressure-buffering means, taken along a line parallel to the direction of the pleats, and FIG. 12(b) is a diagrammatic cross-sectional view of an example of the humidifying apparatus of the present invention employing a pressure-buffering means, taken along a line perpendicular to the direction of the pleats. In FIGS. 12(a) and 12(b), the pressure-buffering means is constructed by cutting away, from a pipeline, a strip-shaped portion thereof (having its length in parallel to the longitudinal direction of the pipeline) to thereby form an opening B, followed by welding of the resultant partially cutaway pipeline to the housing. FIGS. 13(a) and 13(b) are diagrammatic views of a humidifying element which is substantially the same as that shown in FIGS. 12(a) and 12(b), except that pipelines having square-shaped cross-sections are used as pressure-buffering means, and that the humidifying element is divided into two parts. (With respect to "division of humidifying element", an explanation is given below.)

FIGS. 9(a), 9(b) and 9(c) are diagrammatic top views showing examples of how to flow a gas through the pressure-buffering means. FIG. 9(a) shows a channel construction in which a gas flows from a lower portion on the left-hand side to an upper portion on the right-hand side. FIG. 9(b) shows a channel construction in which a gas flows from a lower portion on the left-hand side to a lower portion on the right-hand side. FIG. 9(c) shows a channel construction in which a gas is fed from two gas-intakes respectively located at the lower and upper portions on the left-hand side, and flowed to two gas-outlets respectively located at the lower and upper portions on the right-hand side. Among the above-mentioned channel constructions, from the viewpoint of pressure buffering effect, the channel construction as shown in FIG. 9(c) is most preferred. For example, when a channel is divided into at least two sub-channels, or when a channel is not divided into sub-channels and the channel construction as shown in FIG. 9(c) is used, the total number of gas-intakes and gas-outlets exceeds the total number of outside conduits (i.e., four outside conduits which lead to the dry-side gas-intake, the dry-side gas-outlet, the wet-side gas-intake and the wet-side gas-outlet, respectively). In such a case, it is necessary to provide a connecting conduit having a branched structure between the outside conduit and the pressure-buffering means. It is preferred that the connecting conduit has a structure such that the gas flow rate at each of the plurality of gas-intakes and/or gas-outlets of the humidifying apparatus becomes as uniform as possible. It is preferred that the variation of the gas flow rate is not more than ±20%, more advantageously not more than ±10%, still more advantageously not more than ±5%, still more advantageously not more than ±2%, most advantageously not more than ±1%, based on the average gas-flow rate.

The volume of the pressure-buffering means is defined as the volume of the space which is present between openings A and B. When a product of the cross-sectional area of the outside conduit and the inner width of the pleated functional element is used as a reference volume, it is preferred that the ratio of the volume of the pressure-buffering means to the reference volume is from 0.1 to 100. In the present invention, this ratio is referred to as "ratio (VB)". The lower limit of the ratio (VB) is preferably 0.2 or more, more preferably 0.5 or more, still more preferably 1.0 or more, most preferably 2.0 or more. When the ratio (VB) is less than 0.1, it is possible that satisfactory pressure-buffering effect cannot be achieved. With respect to the upper limit of the ratio (VB), there is no particular limitation. However, when the ratio (VB) is more than 100, a disadvantage is caused in that the size of the humidifying apparatus becomes larger than required.

It is preferred that the width of the pressure-buffering means is from 50 to 800%, based on the width of the gas-intake or gas-outlet of the humidifying element. The lower limit of the width of the pressure-buffering means is preferably 70% or more, more preferably 80% or more, still more preferably 90% or more. The upper limit of the width of the pressure-buffering means is preferably 600% or less, more preferably 400% or less, still more preferably 200% or less.

The width of opening B of the pressure-buffering means is preferably 50% or more, more preferably 80% or more, still more preferably 90% or more, still more preferably 95% or more, based on the width of the pressure-buffering means.

The cross-sectional area of opening B of the pressure-buffering means is preferably 50% or more, more preferably 100% or more, still more preferably 200% or more, still more preferably 300% or more, still more preferably 400% or more, most preferably 500% or more, based on the cross-sectional area of opening A.

With respect to the mode for contacting the dry gas with the moist gas through the humidifying membrane, any of the conventional modes (such as counterflow, parallel flow, cross flow and radial flow) can be employed. Among the above-mentioned methods, counterflow and parallel flow are preferred.

[Division of the Humidifying Element]

Each of FIGS. 13(a) and 13(b) is a diagrammatic cross-sectional view of an example of a humidifying element (used in the present invention) divided into two parts. In each of FIGS. 13(a) and 13(b), two pleated functional elements 6 are sandwiched between two opposite pressure plates. Each of the pleated functional elements 6 is provided with gas-intakes, gas outlets, a wet-side channel and a dry-side channel, so as to constitute two humidifying elements sandwiched between the two opposite pressure plates. Such division of the humidifying element provides advantages with respect to the pressure plates. Specifically, as shown in FIGS. 13(a) and 13(b), when the humidifying element is divided into two parts, pressurizing means (i.e., stud bolts 81 in FIGS. 13(a) and 13(b)) may be provided not only at the peripheral portions of the pressure plates, but also at a position between the two pleated functional elements, so that it becomes possible to reduce the distance between mutually adjacent pressurizing means (i.e., distance between mutually adjacent beams), thereby rendering it possible to use pressure plates which have lower strength and lower weight and, which are lower in cost.

[Stacking of Humidifying Elements]

Figure 14:
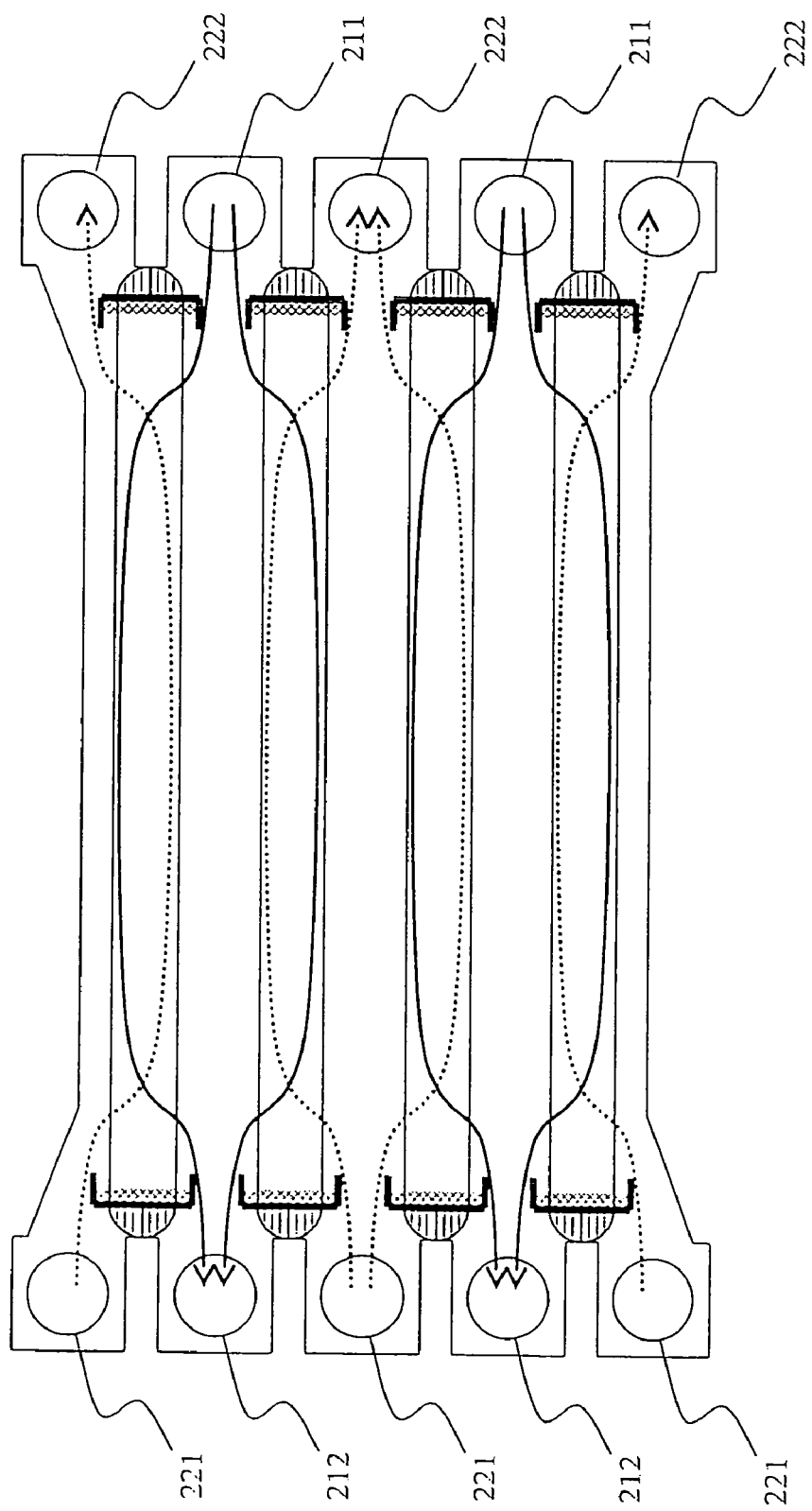
FIG. 14 is a diagrammatic view of an example of stacking of a plurality of humidifying elements used in the present invention.

FIG. 14 is a diagrammatic view of an example of stacking of a plurality of humidifying elements used in the present invention. In the present invention, by the use of a plurality of humidifying elements disposed in a housing, it becomes possible to achieve a large membrane area. As mentioned above, in the present invention, it is preferred that the height (H) of the pleats is in the range of from 5 to 200 mm. However, for example, when the size of the humidifying apparatus has a large limitation in the planar direction thereof, and a small limitation in the heightwise direction thereof, a plurality of humidifying elements may be stacked so that mutually adjacent pleated functional elements are disposed in a face-to-face relationship on their respective wet-sides or on their respective dry-sides, thereby sharing the wet-side channel or the dry-side channel. By such stacking of a plurality of humidifying elements, a large membrane area can be achieved.

[Performance of Humidifying Element]

The performance of the humidifying apparatus of the present invention can be evaluated by the following criteria. (Hereinbelow, for simplicity sake, the dry-side gas-intake, the dry-side gas outlet, the wet-side gas-intake and the wet-side gas-outlet are designated as "DI", "DO", "WI" and "WO", respectively.)

(Amount of water vapor transferred (g/min))=(amount of water vapor flowed through $DO$)−(amount of water vapor flowed through $DI$)

(Amount of water vapor transferred per volume of pleated functional element (g/min/L))=(Amount of water vapor transferred (g/min))÷(volume of pleated functional element)

(Average water vapor partial pressure difference (kPa))=(water vapor partial pressure difference at $WI$ +water vapor partial pressure difference at $WO$−water vapor partial pressure difference at $DI$−water vapor partial pressure difference at $DO$)/2

(Water vapor exchange ability (g/min/kPa))=(Amount of water vapor transferred)/(Average water vapor partial pressure difference)

(Water vapor exchange ability per volume of pleated functional element (g/min/kPa/L))=(Water vapor exchange ability)/(volume of pleated functional element)

(Overall performance (g/min/kPa$^2$/L))=(Water vapor exchange ability per volume of pleated functional element)/(total pressure loss)×1,000

The water vapor exchange ability per volume of pleated functional element is preferably 0.1 or more, more preferably 0.2 or more, still more preferably 0.5 or more, still more preferably 0.7 or more, most preferably 1.0 or more. When the water vapor exchange ability per volume of pleated functional element is less than 0.1, for achieving a satisfactory humidifying performance, it becomes necessary to enlarge the humidifying apparatus to a disadvantageously large size. In many applications of the humidifying apparatus, when the water vapor exchange ability per volume of pleated functional element is 2.5 or more, a satisfactory humidifying performance can be achieved.

The pressure loss on each of the dry-side and the wet-side is preferably 50 kPa or less, more preferably 20 kPa or less, still more preferably 10 kPa or less, still more preferably 5 kPa or less, most preferably 3 kPa or less. In many applications of the humidifying apparatus, when the pressure loss exceeds 50 kPa, the energy loss from the humidifying apparatus becomes disadvantageously large.

The overall performance is preferably 10 or more, more preferably 20 or more, still more preferably 40 or more, still more preferably 60 or more, most preferably 80 or more.

BEST MODE FOR CARRYING OUT THE INVENTION

Hereinbelow, the present invention will be described in more detail with reference to the following Examples and Comparative Examples which should not be construed as limiting the scope of the present invention.

Example 1

[Humidifying Membrane]

A polyethylene porous membrane (thickness: 16 μm, weight per unit area: 9 g/m$^2$, porosity: 40%, gas permeability: 300 seconds) was immersed in a solution of a perfluoro ion exchange resin (trade name: Aciplex-SS-1000, manufactured and sold by Asahi Kasei Kabushiki Kaisha) using a continuous immersion apparatus, followed by drying at 80° C., thereby obtaining a composite humidifying membrane. The amount of the perfluoro ion exchange resin coated on the membrane was 4 g/m$^2$.

[Pleated Functional Element]

On each side of the above-obtained humidifying membrane, gas-permeable reinforcing materials were superimposed as follows. On one side of the humidifying membrane, a polypropylene net A (weight per unit area: 104 g/m$^2$, fiber diameter: 0.3 mm, opening ratio: 66%, thickness: 0.7 mm) and a polypropylene net B (weight per unit area: 50 g/m$^2$, fiber diameter: 0.25 mm, opening ratio: 86%, thickness: 0.5 mm) were superimposed. On the other side of the humidifying membrane, a polypropylene net C (weight per unit area: 50 g/m$^2$, fiber diameter: 0.25 mm, opening ratio: 86%, thickness: 0.5 mm) was superimposed, thereby obtaining a humidifying membrane/reinforcing layer structure. The obtained humidifying membrane/reinforcing layer structure was subjected to pleating to thereby obtain a pleated structure having a height (H) of 40 mm. Then, a channel-shaped reinforcing frame having bent portions (each of which had a width of 10 mm) was gas-tightly secured to the periphery of the pleated structure using an epoxy adhesive so that the channel shape received therein the periphery of the pleated structure, thereby obtaining a plane type pleated functional element having a size of 400 mm (width)×120 mm (length)× 44 mm (height). The number (N) of the pleats of the pleated structure was 176, the pleats pitch (P) was 2.3 mm, and the ratio (M) of the pleats pitch (P) to the thickness (T) of the humidifying membrane/reinforcing layer structure (i.e., pleated structure) was 1.4.

The buckling strength of the pleated functional element was measured in accordance with JIS K-7220. More specifically, the bucking strength is defined as the stress sustained by a pleated functional element which has been compressed in the direction of the height of the pleats at a compression rate of 5%/sec to a compression ratio of 10%. For the compression, a pressure disc having a diameter of 3 cm was used, and the whole surface of the disc was used to compress the pleated functional element. As the cross-sectional area necessary for the calculation of the buckling strength, the area of one surface the disc was used. From the measurement and calculation, it was found that the buckling strength of the pleated functional element was 110 kPa.

[Humidifying Element and Humidifying Apparatus]

The pleated functional element obtained above was gas-tightly secured to a pressure-plate type housing (shown in FIGS. 12(a) and 12(b)) provided with four pressure-buffering means, each having an opening A and an opening B, thereby assembling a humidifying apparatus containing a humidifying element, wherein each of the dry-side channel and the wet-side channel was not divided into sub-channels. The dry-side gas-intake and the wet-side gas-intake were located in a positional relationship such that the gas in the dry-side channel and the gas in the wet-side channel were caused to flow counter-currently to each other. Each of the openings A of the pressure-buffering means was connected to an outside conduit. The cross-sectional area of opening A was 5.1 cm$^2$. The ratio (VB) of the volume of the pressure-buffering means to the reference volume (i.e., a product of the cross-sectional area of outside conduit and the inner width of the pleated functional element) was 0.8. The width and length of each of the gas-intakes and the gas-outlets were 380 mm and 20 mm, respectively. The width and length of the pressure-buffering means were 400 mm and 38 mm, respectively. The width and length of opening B were 380 mm and 20 mm, respectively. Further, the ratio (C) of the height of the wet-side channel to the height of the pleats of the pleated structure was 1.08 (the height of the wet-side spatial channel: 3.0 mm) and the ratio (C) of the height of the dry-side channel to the height of the pleats of the pleated structure was 1.02 (the height of the dry-side spatial channel: 1.0 mm). The volume ratio (V) of the wet-side channel to the dry-side channel was 1.05. The wet-side spatial channel was provided with a wire mesh (thickness: 3 mm, wire diameter: 1.5 mm, opening ratio: 78%) as a gas channel-control means.

[Evaluation]

A water vapor-containing air (relative humidity: 90%, temperature: 80° C.) was supplied to the wet-side channel of the humidifying apparatus from a wet-side inlet (i.e., the opening of the outside conduit which leads, through the wet-side first pressure-buffering means, to the wet-side gas-intake) at a dry flow rate of 3,000 NL/min under a pressure of 40 kPaG. On the other hand, a dry air (relative humidity: 1%, temperature: 80° C.) was supplied to the dry-side channel of the humidifying apparatus from a dry-side inlet (i.e., the opening of the outside conduit which leads, through the dry-side first pressure-buffering means, to the dry-side gas-intake) at a dry flow rate of 3,000 NL/min under a pressure of 60 kPaG.

The humidifying apparatus was operated under the above-mentioned conditions for 1 hour. Then, the pressure, relative humidity and temperature of the air at each of the wet-side outlet (i.e., the opening of the outside conduit which communicates, through the wet-side second pressure-buffering means, with the wet-side gas-outlet) and the dry-side outlet (i.e., the opening of the outside conduit which communicates, through the dry-side second pressure-buffering means, with the dry-side gas-outlet) were measured. Based on the results of the measurement, the amount of water vapor transferred through the humidifying membrane was determined.

The results are shown in Table 1.

Example 2

Using the same humidifying membrane and gas-permeable reinforcing material as in Example 1, a pleated structure having a height (H) of the pleats of 40 mm was produced. Then, a channel-shaped reinforcing frame having bent portions (each of which had a width of 10 mm) was gas-tightly secured to the periphery of the pleated structure using an epoxy adhesive so that the channel shape received therein the periphery of the pleated structure, thereby obtaining a plane type pleated functional element having a size of 200 mm (width)×240 mm (length)×44 mm (height). The number (N) of the pleats of the pleated structure was 88 and the pleats pitch (P) was 2.3 mm.

The obtained pleated functional element was gas-tightly secured to a housing (as shown in FIG. 8(d)) having six openings (three openings on the wet-side and three openings on the dry-side), each of the six openings being provided with a pressure-buffering means, thereby assembling a humidifying apparatus containing a humidifying element, wherein each of the dry-side channel and the wet-side channel was divided into two sub-channels. On the wet-side, the middle opening of the three openings was used as a wet-side gas-intake, and the pressure-buffering means provided in association therewith was connected to an outside conduit. On the other hand, on the dry-side, the two outer openings of the three openings were used as dry-side gas-intakes, and the pressure-buffering means provided in association therewith were joined with one pipe which was connected to an outside conduit. The remainder of the construction of the humidifying apparatus was the same as in Example 1.

The above-obtained humidifying apparatus was evaluated under the same conditions as in Example 1.

The results are shown in Table 1.

Comparative Example 1

In the same manner as in Example 1 of Unexamined Japanese Patent Application Laid-Open Specification No. 2002-252012, there were produced a cylindrical pleated functional element (pleats pitch: 24 mm, number of pleats: 94), and a cylindrical housing comprising a cylindrical inner segment (diameter: 90 mm, height: 400 mm,) and a cylindrical outer segment (diameter: 150 mm, height: 400 mm), wherein the cylindrical housing had no pressure-buffering means. Using the obtained cylindrical pleated functional element and the housing, a humidifying apparatus which is substantially the same as shown in FIG. 2 of the above-mentioned patent document was assembled. A water vapor-containing air was supplied to the inner channel of the humidifying apparatus, and a dry air was supplied to the outer channel of the humidifying apparatus. The evaluation of the humidifying apparatus was performed under the same conditions as in Example 1 above, except that the relative humidity of the water vapor-containing air supplied to the wet-side gas-intake in the inner channel was changed to 65%. The results are shown in Table 1.

Because the humidifying apparatus assembled in this Comparative Example 1 did not have a pressure-buffering means, the flow of the air supplied to the humidifying membrane was non-uniform. As a result, it was found that the humidifying ability of the humidifying apparatus produced in this Comparative Example 1 was very poor, as compared to the humidifying apparatus of the present invention.

TABLE 1

|  | Example 1 | Example 2 | Comparative Example 1 |
|---|---|---|---|
| Membrane area used (m²) | 1.4 | 1.4 | 1.8 |
| Width of the pleated functional element (mm) | 400 | 200 | 150φ |
| Length of the pleated functional element (mm) | 120 | 240 | 400 |
| Volume of the pleated functional element (L) | 2.2 | 2.2 | 7.1 |
| Humidity of the dry-side channel (% RH) | 27 | 26 | 14 |
| Amount of water vapor transferred (g/min) | 170 | 170 | 71 |
| Water vapor exchange ability (g/min/kPa) | 5.5 | 5.3 | 2.5 |
| Water vapor exchange ability per unit volume (g/min/kPa/L) | 2.6 | 2.5 | 0.4 |

INDUSTRIAL APPLICABILITY

The humidifying apparatus of the present invention has excellent properties with respect to humidifying performance, smallness of pressure loss, volume efficiency and durability. Therefore, the humidifying apparatus of the present invention is very useful in performing efficient humidifying of gasses used in various fields. For example, the humidifying apparatus of the present invention can be suitably used for a room humidifier and especially for supplying moisture to a solid polymer electrolyte type fuel cell.

The invention claimed is:

1. A humidifying apparatus comprising:
a pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer, and
a dry-side channel and a wet-side channel which are, respectively, provided on opposite sides of said pleated functional element, wherein each of said dry-side channel and said wet-side channel has at least one pair of a gas-intake and a gas-outlet,
said humidifying apparatus having a first pressure-buffering means between said gas-intake and an outside conduit connected thereto and a second pressure-buffering means between said gas-outlet and an outside conduit connected thereto,
wherein said humidifying membrane divides the internal space of said pleated functional element into spaces which form a part or whole of the dry-side channel and a part or whole of the wet-side channel, respectively.

2. The humidifying apparatus according to claim 1, which optionally further comprises at least one additional pleated functional element, and wherein said pleated functional element and optionally said at least one additional pleated functional element are sandwiched between two opposite pressure plates, which are gas-tightly attached to the reinforcing frame of said pleated functional element and optionally the reinforcing frame of at least one additional pleated functional element.

3. The humidifying apparatus according to claim 1, wherein at least one channel selected from the group consisting of said dry-side channel and said wet-side channel has two or more pairs of the gas-intakes and the gas-outlets.

4. The humidifying apparatus according to claim 1, wherein at least one channel selected from the group consisting of said dry-side channel and said wet-side channel is divided into at least two sub-channels.

5. The humidifying apparatus according to claim 1, wherein said humidifying membrane has a heat shrinkage ratio of not more than 10%, as measured at 120° C.

6. The humidifying apparatus according to claim 1, wherein the height of the pleats of said pleated structure is in the range of from 5 to 200 mm.

7. The humidifying apparatus according to claim 1, wherein said pleated functional element has a length of 300 mm or less.

8. The humidifying apparatus according to claim 1, wherein said pleated functional element has a buckling strength of 10 kPa or more.

9. The humidifying apparatus according to claim 1, wherein each of said dry-side channel and said wet-side channel has a portion where the ratio (C) of the height of the channel to the height of the pleats of the pleated structure is in the range of from 1.0 to 5.0,
the volume ratio (V) of said wet-side channel to said dry-side channel is in the range of from 0.5 to 100, and
the ratio (M) of the pleats pitch (P) of the pleated structure to the thickness (T) of the pleated structure is in the range of from 0.8 to 3.0.

10. The humidifying apparatus according to claim 1, wherein at least one channel selected from the group consisting of said dry-side channel and said wet-side channel has a gas channel-control means provided in a space above the pleats of the pleated structure.

11. The humidifying apparatus according to claim 1, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer,
wherein said pleated functional element and said at least one additional pleated functional element are laterally arranged.

12. The humidifying apparatus according to claim 1, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer,
wherein said pleated functional element and said at least one additional pleated functional element are piled one upon another so that two mutually adjacent pleated functional elements are disposed in a face-to-face relationship on their respective wet-sides or on their respective dry-sides.

13. The humidifying apparatus according to claim 2, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer,
wherein said pleated functional element and said at least one additional pleated functional element are piled one upon another so that two mutually adjacent pleated functional elements are disposed in a face-to-face relationship on their respective wet-sides or on their respective dry-sides.

14. The humidifying apparatus according to claim 3, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer,
wherein said pleated functional element and said at least one additional pleated functional element are piled one upon another so that two mutually adjacent pleated functional elements are disposed in a face-to-face relationship on their respective wet-sides or on their respective dry-sides.

15. The humidifying apparatus according to claim 4, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer,
wherein said pleated functional element and said at least one additional pleated functional element are piled one upon another so that two mutually adjacent pleated functional elements are disposed in a face-to-face relationship on their respective wet-sides or on their respective dry-sides.

16. The humidifying apparatus according to claim 5, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer, wherein said pleated functional element and said at least one additional pleated functional element are piled one upon another so that two mutually adjacent pleated functional elements are disposed in a face-to-face relationship on their respective wet-sides or on their respective dry-sides.

17. The humidifying apparatus according to claim 6, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer, wherein said pleated functional element and said at least one additional pleated functional element are piled one upon another so that two mutually adjacent pleated functional elements are disposed in a face-to-face relationship on their respective wet-sides or on their respective dry-sides.

18. The humidifying apparatus according to claim 7, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer, wherein said pleated functional element and said at least one additional pleated functional element are piled one upon another so that two mutually adjacent pleated functional elements are disposed in a face-to-face relationship on their respective wet-sides or on their respective dry-sides.

19. The humidifying apparatus according to claim 8, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer, wherein said pleated functional element and said at least one additional pleated functional element are piled one upon another so that two mutually adjacent pleated functional elements are disposed in a face-to-face relationship on their respective wet-sides or on their respective dry-sides.

20. The humidifying apparatus according to claim 9, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer, wherein said pleated functional element and said at least one additional pleated functional element are piled one upon another so that two mutually adjacent pleated functional elements are disposed in a face-to-face relationship on their respective wet-sides or on their respective dry-sides.

21. The humidifying apparatus according to claim 10, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer, wherein said pleated functional element and said at least one additional pleated functional element are piled one upon another so that two mutually adjacent pleated functional elements are disposed in a face-to-face relationship on their respective wet-sides or on their respective dry-sides.

22. The humidifying apparatus according to claim 11, which further comprises at least one additional pleated functional element comprising a pleated structure and, secured to said pleated structure around a periphery thereof, a reinforcing frame, wherein said pleated structure is comprised of a humidifying membrane and, superimposed on at least one surface thereof, a gas-permeable reinforcing material layer, wherein said pleated functional element and said at least one additional pleated functional element are piled one upon another so that two mutually adjacent pleated functional elements are disposed in a face-to-face relationship on their respective wet-sides or on their respective dry-sides.

* * * * *